(12) United States Patent
O'Neal et al.

(10) Patent No.: US 7,035,933 B2
(45) Date of Patent: Apr. 25, 2006

(54) SYSTEM OF DISTRIBUTING CONTENT DATA OVER A COMPUTER NETWORK AND METHOD OF ARRANGING NODES FOR DISTRIBUTION OF DATA OVER A COMPUTER NETWORK

(75) Inventors: Michael O'Neal, Ruston, LA (US); Joshua Kleinpeter, Pasadena, CA (US)

(73) Assignee: Network Foundation Technologies, Inc., Los Angeles, CA (US)

( * ) Notice: Subject to any disclaimer, the term of this patent is extended or adjusted under 35 U.S.C. 154(b) by 785 days.

(21) Appl. No.: 09/952,907

(22) Filed: Sep. 13, 2001

(65) Prior Publication Data

US 2003/0051051 A1    Mar. 13, 2003

(51) Int. Cl.
    *G06F 15/16* (2006.01)
(52) U.S. Cl. .................. 709/233; 709/201; 709/216; 709/225; 370/323; 370/325; 370/395.2
(58) Field of Classification Search ............... 709/233, 709/201, 216, 225; 370/323, 325, 395.2
See application file for complete search history.

(56) References Cited

U.S. PATENT DOCUMENTS

| 5,884,031 | A | 3/1999 | Ice | |
|---|---|---|---|---|
| 6,199,164 | B1* | 3/2001 | Nishimoto et al. | 713/200 |
| 6,341,292 | B1* | 1/2002 | Cho et al. | 707/203 |
| 6,477,548 | B1* | 11/2002 | Nihei | 707/204 |
| 6,539,011 | B1* | 3/2003 | Keenan et al. | 370/352 |
| 6,571,290 | B1* | 5/2003 | Selgas et al. | 709/228 |

* cited by examiner

Primary Examiner—David Wiley
Assistant Examiner—Thanh T Nguyen
(74) Attorney, Agent, or Firm—Adam B. Landa; Greenberg Traurig, LLP

(57) ABSTRACT

The invention is a system for distributing content data over a computer network and a method of arranging receiver nodes in a computer network such that the capacity of the server is effectively multiplied many times over, and may even be increased exponentially. The invention takes advantage of the excess capacity many receiver nodes possess, and uses them as repeaters. The distribution system includes nodes having databases which indicate their ancestors and descendants so that reconfiguration of the distribution network may be accomplished without burdening the system's primary server.

26 Claims, 22 Drawing Sheets

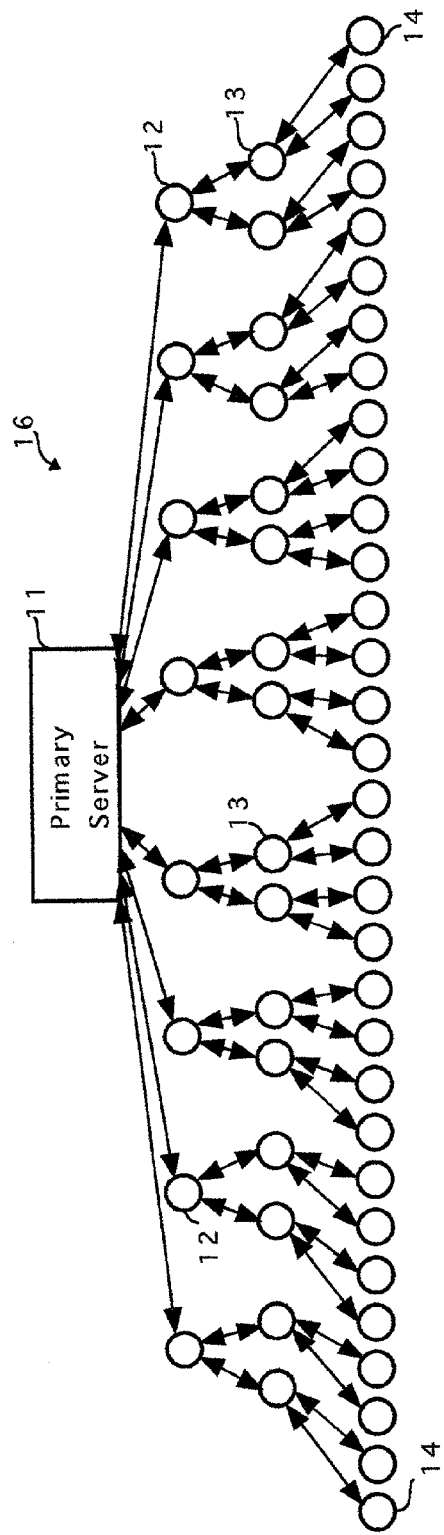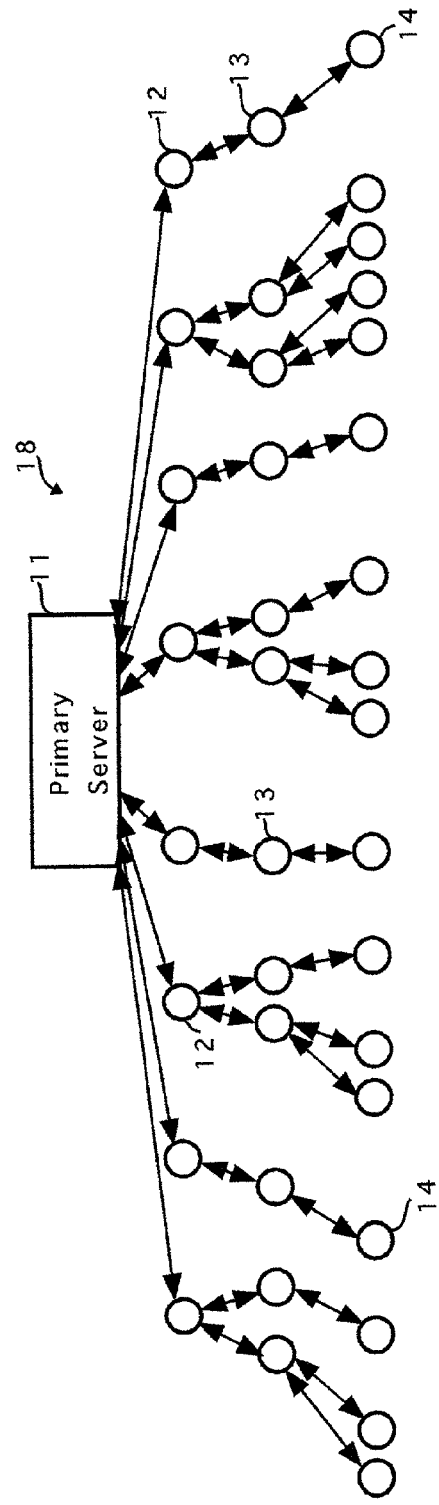
Fig. 4
Fig. 5

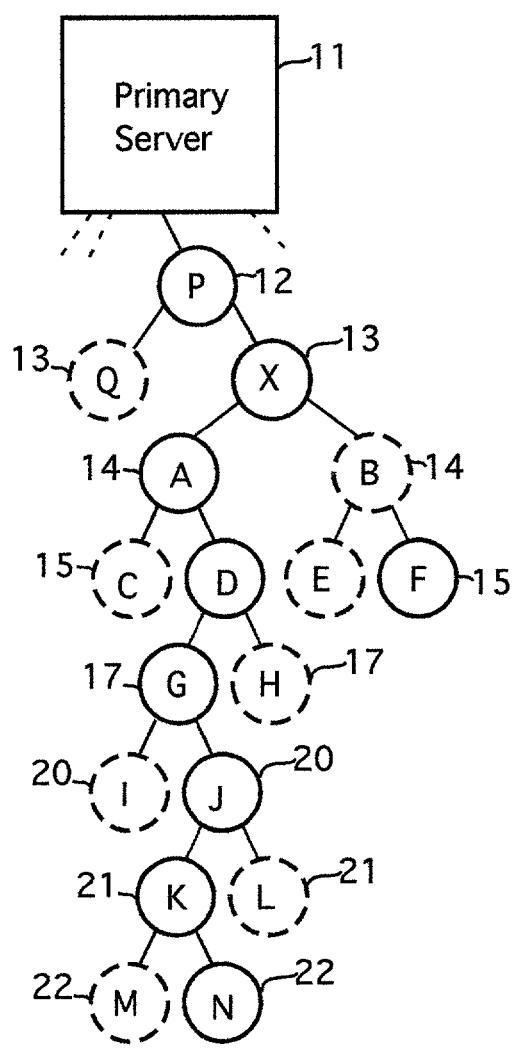
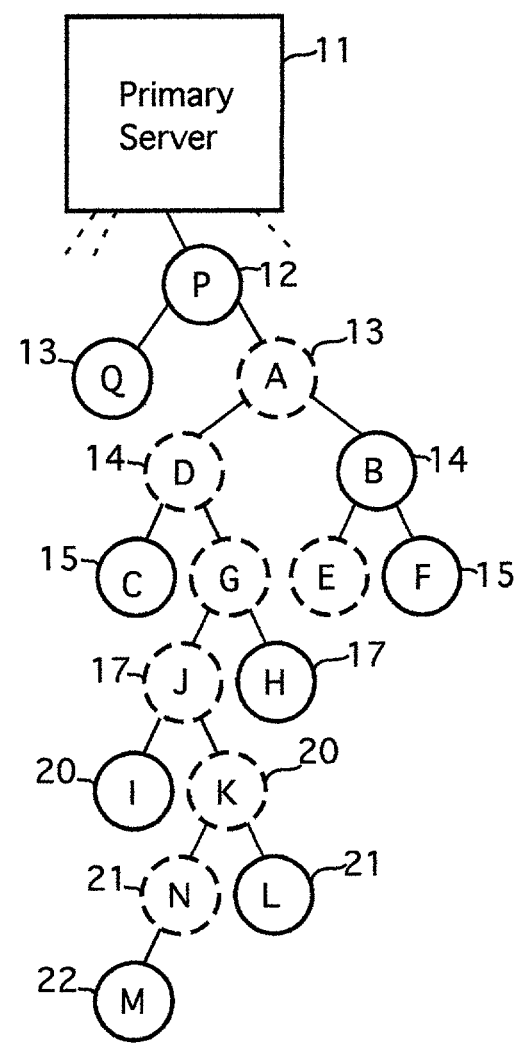
Fig. 28                    Fig. 29

SYSTEM OF DISTRIBUTING CONTENT DATA OVER A COMPUTER NETWORK AND METHOD OF ARRANGING NODES FOR DISTRIBUTION OF DATA OVER A COMPUTER NETWORK

BACKGROUND OF THE INVENTION

1. Field of the Invention

This invention relates to a system for distributing content data over a computer network and a method for arranging nodes for distribution of data over a computer network. The system and method of the present invention are particularly useful for the distribution of streaming video over the Internet.

2. Prior Art

In a computer network such as the Internet, each node in the network has an address. A computer system resident at a particular address may have sufficient bandwidth or capacity to receive data from, and to transmit data to, many other systems at other addresses. An example of such a system is a server, many commercial versions of which can simultaneously exchange data with thousands of other computer systems.

A computer system at another location may have only sufficient bandwidth to effectively exchange data with only one other computer system. An example of such a system is an end user's personal computer connected to the Internet by a very low speed dialup modem. However, even typical personal computers connected to the Internet by higher speed dialup modems have sufficient bandwidth that they may exchange data simultaneously with several other computer systems. An end user's personal computer system may also have even greater bandwidth when connected to the Internet by ISDN lines, DSL lines, cable modems, T1 lines or even higher capacity links. As discussed more fully below, the present invention takes advantage of the availability of such higher capacity end user systems.

In a typical situation, as shown in FIG. 1, a content provider distributes its data by making it available on a server node 8 simultaneously to a plurality of users at user nodes 12. The double-headed arrows show the two-way communication between each end user's system and the server. Essentially the content provider's server transmits a separate stream of signals to each receiver node. To accommodate additional users, the content provider would typically either add equipment to increase capacity or it would engage a mirror site to accomplish the same result as adding equipment. The capacities of the end users is of virtually no consequence in such a system.

Another system for distributing data is exemplified by the Napster™ music file exchange system provided by Napster, Inc. of Redwood City, Calif. Until recently, the Napster™ system, illustrated in FIG. 2, was focused on the distribution between end users of data representing music. Obviously, data representing other information could be distributed by the Napster™ system.

In the Napster™ system a copy of the music data is not kept on the server. The server 9 instead maintains a database of the music files on the computers of users who are logged onto the server. When a first user 12a sees that a desired music file is available from a second logged on user 12b, the first user causes his computer to query the Napster™ server for the second user's node address and a connection is made between the first and second user's computers through which the first user's computer notifies the second user's computer of the desired file and the second user's computer responds by transmitting a copy of the desired music file directly to the first user's computer. In the Napster™ system, users must become "members" and have special purpose software loaded into their computers, so that each user's music files may be catalogued by the Napster™ server. However, a first user attempting to download a particular file from a second user must start completely over again if the second user cancels its transmission or goes off line during the data transfer.

The prior art data distribution arrangements work reasonably well with data representing graphics or text. The data file for a web page is usually sufficiently small that relatively few packets of information need be transmitted from a server to a user node. Browser software on the computer system at a user node takes the information it receives, temporarily stores it in buffer memory defined by the browser software, and assembles the appropriate image on the computer system's monitor (or otherwise stores the information in the computer system's long-term memory). The data transfer transactions are usually short and the file sizes relatively small compared to the memory assets in the typical user's computer system. So, during transactions involving graphics and/or text the bandwidths of most servers are rarely over-taxed and most users are able to make satisfactory connections to servers. Also, the memory assets of the typical computer system at the user node are not significantly impacted.

However, when the data files represent moving images and/or sound, file sizes are much larger. This makes sense of course. A web page depicting solely a graphic of a man standing may require X bytes. A video clip depicting a man walking for 10 seconds would likely take at least 100X bytes (for a very jagged moving image depicted at 10 frames per second). In fact, in order to have clear moving images and sound (i.e., to maintain high resolution), the data files could be enormous.

Various compression/decompression software programs have kept the file sizes manageable, so that downloading of video clips and music files from servers or the exchanging of such data has been somewhat acceptable, as evidenced by the recent popularity of the Napster™ music file exchange. In schemes such as described in this paragraph, the data file representing the moving images and/or audio is completely downloaded by a user's computer system from a server (or from another user's computer system connected to server similar to that used in the Napster™ system) and, after downloading is completed, the user may use an image and/or audio player program (sometimes referred to in the Internet world as a "plugin") to play the moving images and/or the audio.

For many users, the demand on the memory assets in the computer systems would be too great for anything but a short video clip or a few music files. For most users, the time delay (having to download first and then play) is not acceptable even if, for argument sake, the demand on the user's computer system's memory assets were manageable. And, for live events, such as political debates, sports events, trials and the like, the download and then play technique is just plain inappropriate.

So engineers developed what is known as "streaming media." Streaming media is a series of packets of compressed data, each packet representing moving images and/or audio.

To help understand streaming media, it is helpful to review again the traditional Internet distribution method. Since a "node" in a computer network system such as described herein would not exist but for a computer system being active on such node, the terms "node" and "computer system" may be used interchangeably. So, the term "node" should be understood to include an active computer system. Each node, whether it is a server node or a user node, in a computer network has a unique identification (sometimes referred to as an "IP" address) associated with it. On the Internet, the unique address is referred to as a Uniform Resource Locator ("URL"). A user desiring to obtain data from a particular server enters that server's URL into the user's browser program. The browser program causes a connection request signal to be sent over the Internet to the server. If the server has the capacity to accept the connection, the connection is made between the server and the user node. Files requested by the user are transmitted by the server in full to the user node, and the browser program stores the files in buffer memory and displays the content on the user's computer system monitor. (Some files may be more permanently stored in the computer system's memory for later viewing or playing.) The connection with the server is terminated once the files have been received at the user node, or it is terminated a short time thereafter. Either way, the connection is usually of a very short time duration.

With streaming media, the contact between the server and user nodes is continuous. When a connection between a server node and user node is made and streaming media is requested, the server sends streaming media packets of data to the user node in a distribution network such as shown in FIG. 1. A streaming media player (i.e., software, such as RealMedia® from RealNetworks, Inc. of Seattle, Wash., installed on the user's computer system) causes the data to be stored in buffer memory. The player decompresses the data and begins playing the moving images and audio represented by the data on the user's computer system. As the data from a packet is played, the buffer containing that packet is emptied and becomes available to receive a new packet of data. As a result, the memory assets of a user's computer are not overly taxed. Continuous action content, such as the display of motion picture films and recorded television shows may be distributed and played in "real time," and live events, such as concerts, football games, court trials, and political debates may be transmitted and viewed "live" (with only the brief delays needed for compression of the data being made available on the server, transmission from the server to the user node, and decompression and play on the user's computer system preventing a user from seeing the event at the exact same moment in time as a person actually at the event). And, when the systems are working as designed, the server node and user node stay connected to each other until all the packets of data representing the content have been transmitted.

However, neither the traditional distribution scheme illustrated in FIG. 1 nor the Napster™ scheme illustrated in FIG. 2 is particularly useful for the anticipated growth in the distribution of streaming media for "appointment" transmission of audiovisual content such as live or pre-recorded concerts, court trials, motion picture films, videos or television shows, with acceptable levels of quality. It is anticipated that streaming media transmissions will be events intended to reach large audiences, much in the way that television shows transmitted over television cable and broadcast media reach large audiences. Few, if any, servers, with or without mirror sites, have the bandwidth necessary to transmit streaming media to the anticipated number of users which would be simultaneously logging on to view a particular show.

SUMMARY OF THE INVENTION

The invention is a system for distributing content data over a computer network and a method of arranging receiver nodes in a computer network such that the capacity of the server is effectively multiplied many times over, and may even be increased exponentially. The invention takes advantage of the excess capacity many receiver nodes possess, and uses them as repeaters. The distribution system includes nodes having databases which indicate their ancestors and descendants so that reconfiguration of the distribution network may be accomplished without burdening the system's primary server. The invention includes a process for configuring a computer information distribution network having a primary server node and user nodes docked in a cascaded relationship, and reconfiguring the network in the event that a user node departs from it. The process includes the steps of providing a new user node (or a connection requesting user node) with a connection address list of nodes within the network, having the new user node go to the node at the top of the connection address list, determine whether that node is still part of the distribution network, and connect thereto if it is, and if it is not, to go to the next node on the connection address list. When a user node departs from the distribution network, a propagation signal is transmitted to the nodes below it in the network, causing them to move up in the network in a predetermined order.

BRIEF DESCRIPTIONS OF THE DRAWINGS

FIG. 4 is a schematic drawing of another embodiment of a computer information distribution network formed pursuant to the present invention.

FIG. 5 is a schematic drawing of a third embodiment of a computer information distribution network formed pursuant to the present invention.

FIG. 28 is a schematic drawing of another topology of the computer information distribution network before a reconfiguration event.

FIG. 29 is a schematic drawing of the topology of the computer information distribution network shown in FIG. 28 after a reconfiguration event.

DETAILED DESCRIPTION OF THE INVENTION

Figure 1:
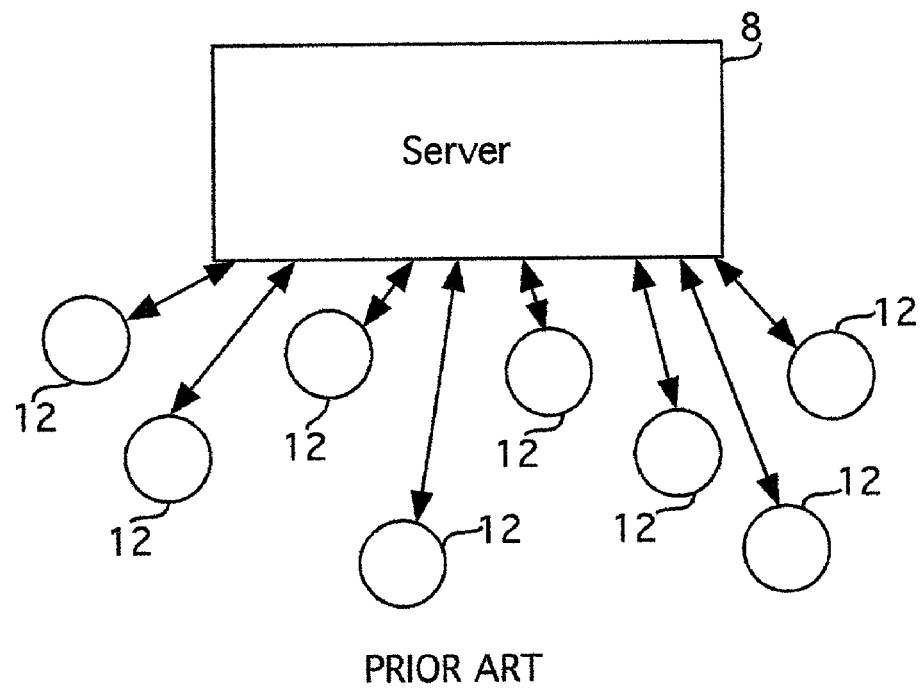
FIG. 1 is a schematic drawing of a prior art computer information distribution network.
Figure 2:
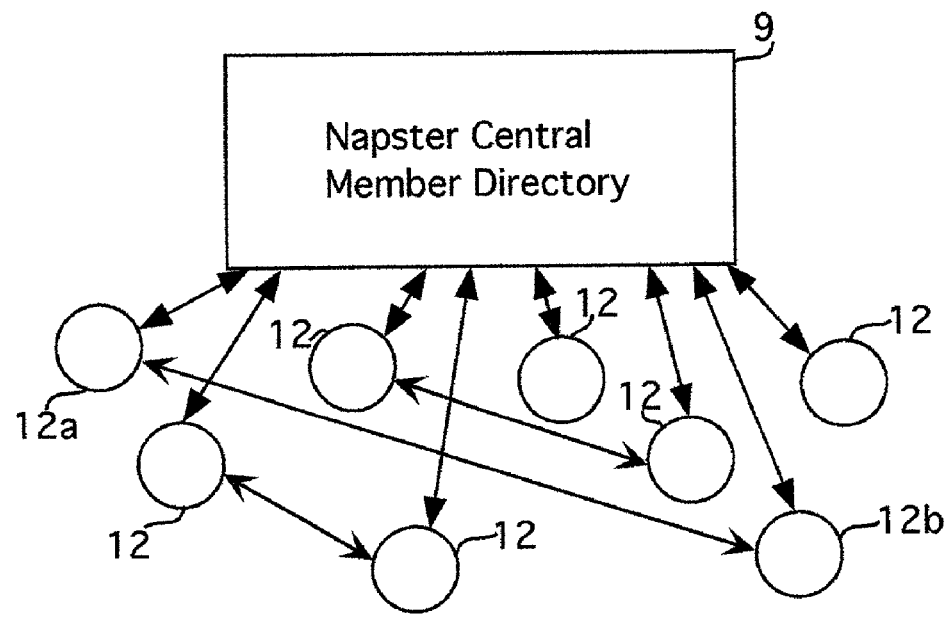
FIG. 2 is a schematic drawing of another prior art computer information distribution network.

The preferred embodiments of the subject invention are illustrated in the attached drawings which are referred to herein. The same reference numeral will be used to identify identical elements throughout the drawings.

Figure 3:
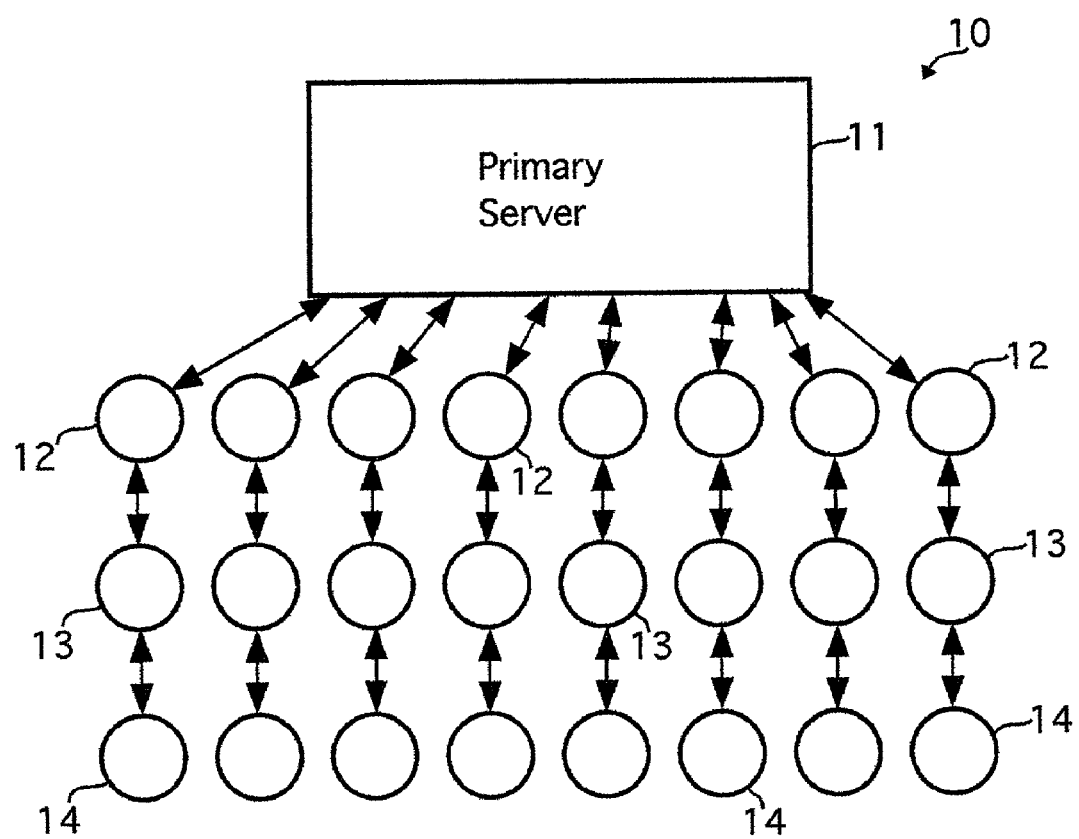
FIG. 3 is a schematic drawing of an embodiment of a computer information distribution network formed pursuant to the present invention.

FIG. 3 is an illustration of a linear propagation arrangement 10 of a computer network. Except as described further below, the primary server node (or simply, primary server) 11 provides data to user nodes 12 connected directly to it (sometimes referred to as "first level user nodes") in the same manner as described in connection with the server node and user nodes shown in FIG. 1 when streaming media is involved. Each first level user node has a second level user node 13 connected to it and each second level user node 13 has a third level user node 14 connected to it. The computer system at each first level user node 12 passes a copy of the data received from server node 11 to the computer system at the second level user node 13 attached to such first level user node 12. The computer system at each second level user node 13 in turn passes the data onto the computer system at the fourth level user node 14 attached to it.

As more fully discussed below, the computer systems at the server and user nodes have distribution software installed in them which enable the nodes to be arranged as shown and for the computer systems to receive and retransmit data.

The cascadingly connected arrangement of nodes (i.e., first level nodes are connected to the server, second level nodes are connected to first level nodes, third level nodes are connected to second level nodes and so on) shown in FIG. 3 takes advantage of the bandwidth available in the majority of nodes to simultaneously receive and transmit data. In a linear propagation arrangement, the effective distribution capacity of a server is multiplied by the number of levels of server nodes linked together. In the example of FIG. 3, the distribution capacity of the server node is increased from 8 user nodes to 24 in just three levels.

Many user nodes have at least sufficient bandwidth to receive data from one node and to transmit streams of data simultaneously to two or more other nodes. This capacity could be used in setting up a cascadingly connected exponential propagation arrangement 16 of a computer network as shown in FIG. 4. As the name implies, an exponential propagation arrangement effectively increases the distribution capacity of a server exponentially. For example, with just three levels of user nodes, each having the capacity to retransmit two data streams, the distribution capacity of the server in FIG. 4 is increased from 8 user nodes to 56.

A distribution network may also be set up as a cascadingly connected hybrid linear/exponential arrangement 18 such as shown in FIG. 5.

The effective distribution capacity grows more quickly in a hybrid linear/exponential arrangement with each new level than does the distribution capacity in a linear propagation arrangement, and less quickly than does the distribution capacity in a pure exponential arrangement. However, any of these arrangements allows a server's distribution capacity to be greatly increased with little or no additional investment in equipment for the server.

In FIGS. 1–5 all the connections between nodes are illustrated with arrows on each end. This is intended to signify that data flows in both directions between connected nodes. For example, a user node connected to a server transmits data to the server indicating the identity of the user node, what the user node wants and/or other data, while the server node typically transmits data confirming its identity and containing information and other content to the user node. In the remaining drawings such arrows are not shown for the sake of simplicity. Further, the bulk of data which is transmitted is content (e.g., web pages, music files and streaming media), and such content will be understood to flow downward from node to node in the drawings.

An exponential propagation arrangement is the most desirable. While many and perhaps most user nodes will have sufficient bandwidth to retransmit acceptable quality multiple copies of the data, a number of user nodes will not have sufficient bandwidth to retransmit more than one copy of the data with acceptable quality, and some user nodes will not have sufficient bandwidth to retransmit even a single acceptable copy. So, it is expected that in practice most distribution systems employing the invention will be hybrid propagation networks. In such a system, a personal computer acting as a server node may reach hundreds, thousands or more user nodes, even if the server node itself has capacity to transmit content data directly to one other node.

In the following discussion it will be assumed that the system employing the invention will take advantage of the capability of many user nodes to simultaneously retransmit up to two copies of data. However, it should be understood that the invention could take advantage of user nodes capable of simultaneous retransmission of even higher numbers of copies.

The length of the distribution chains (i.e., the number of levels of user nodes linked through each other to the server) should be kept as small as possible to reduce the probability that the nodes at the ends of the chains will suffer a discontinuity of service. Thus, to maximize the number of user nodes which may be connected to the server while trying to keep the length of the distribution chains as small as possible, the user nodes having the greatest bandwidth should be placed as far up a distribution chain as possible (i.e., be placed as close as possible to the server).

If an unreliable user node is placed near or at the end of a chain, few or no other user nodes would be affected by the unreliable user node's leaving the network. If an unreliable user node were placed at or near the beginning of a chain, many other nodes would be affected by the unreliable node's departure. Because the invention is intended to be particularly useful for appointment viewing of streaming media, in which continuous connection to an audiovisual content source is required, it is important that the most reliable user nodes be placed high up in the chain.

A user node may be deemed unreliable for any of a number of reasons. One is that the user node is connected to the Internet by lines having intermittent failures. Another is that the user is merely sampling the content available on the network and intentionally disconnects the user node from the distribution network after discerning that he or she has no interest in the content.

The present invention positions user nodes in the most advantageous positions, taking into account the dynamic nature of the distribution network, in which many user nodes will enter and leave the distribution network throughout the server's transmission of a streaming media show. In addition, the invention helps preserve the viewing experience of users at user nodes positioned even at the end of a distribution chain.

The server and user nodes will be enabled to perform the operations required to set up and maintain the distribution network by having data distribution software installed on each node.

User Node Arrival

As can be seen from FIGS. 3–5, the distribution chains can be viewed as a plurality of family trees, each family tree being rooted to the server through one of the first level nodes 12. Each node in the distribution network has distribution software loaded in it which enables the node to perform the functions described below. Before any new node may join the distribution network, it must have such software in it as well.

In the examples discussed and illustrated herein, the network topologies have a branch factor of two (i.e., no user node is assigned more than two child nodes to be connected directly to it). A network topology with a branch factor of two may be referred to as a binary tree topology. It should be understood that the teachings set forth herein may be extended to network topologies having branch factors of three, four or more.

Figure 6:
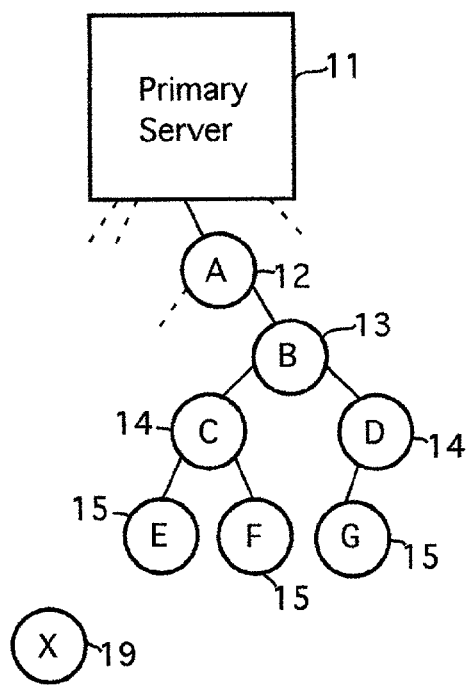
FIG. 6 is a schematic drawing of a particular topology of a computer information distribution network formed pursuant to the present invention.

FIG. 6 is a schematic drawing of a distribution network topology. It shows a distribution chain or family tree rooted to the server 11 through user node A, a first level user node 12. (The dashed lines represent connections from the server to other first level nodes or from node A to another user node.) User node A could be thought of as a child node of the server and as a parent node for other user nodes connected directly to it. User node B, a second level user node 13, could be thought of as A's child. User nodes C and D, third level user nodes 14, may be thought of as B's children and A's grandchildren. User nodes E and F, fourth level user nodes 15, may be thought of as C's children. User node G, also a fourth level user node 15, may be thought of as D's child. And user nodes E, F and G may be thought of as B's grandchildren and A's great grandchildren.

Whenever a new user node (or connection requesting user node) 19, such as node X in FIG. 6, seeks connection to the distribution network, it will first make a temporary connection to the server node in order to begin the process for connecting to the distribution system. The server will discern from the user node a bandwidth rating (discussed below) appropriate to that node and, depending upon the available capacity of the server and any existing distribution chains, the server will either assign the new user node to a spot directly connected to the server or will provide the new user node with a connection path through a tree to the server.

Figure 10:
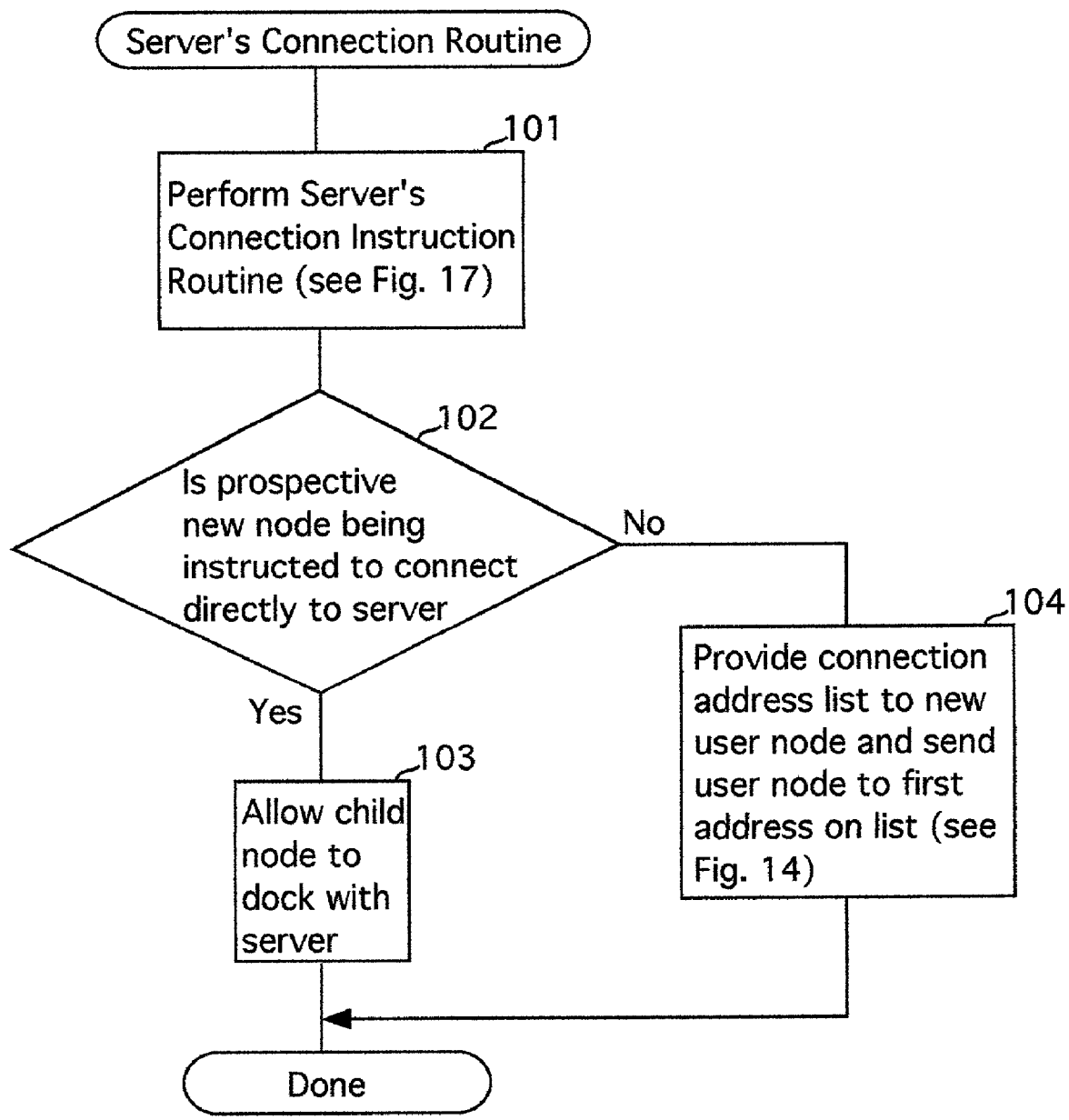
FIG. 10 is a flow diagram showing the Server's Connection Routine which is performed when a prospective child node seeks to join the distribution network.

FIG. 10 is a flow diagram showing the Server's Connection Routine which is performed when a prospective child node seeks to join the distribution network. In step 101 the server performs the Server's Connection Instruction Routine (discussed below), in which the server determines what connection instructions to give to the new user node (or connection requesting user node). The server then goes to step 102 where it determines whether, as a result of the Server's Connection Instruction Routine, the prospective child node is being instructed to dock with the server. If the prospective child node is being instructed to dock with the server, then the server goes to step 103 in which the server would allow the new user node to dock with it, and the server would begin transmitting streaming media (or other data) directly to the new user node. (Note that two different servers could be used. One to perform the server's connection routine and the other to transmit streaming media. Since both servers would be performing server functions, they will be considered a single server for purposes of the description herein.)

If the new user node (i.e., prospective child node) is not being instructed to dock directly with the server, then the server goes to step 104 in which it provides the new user node with an address connection list and disconnects the new user node from the server.

Figure 11:
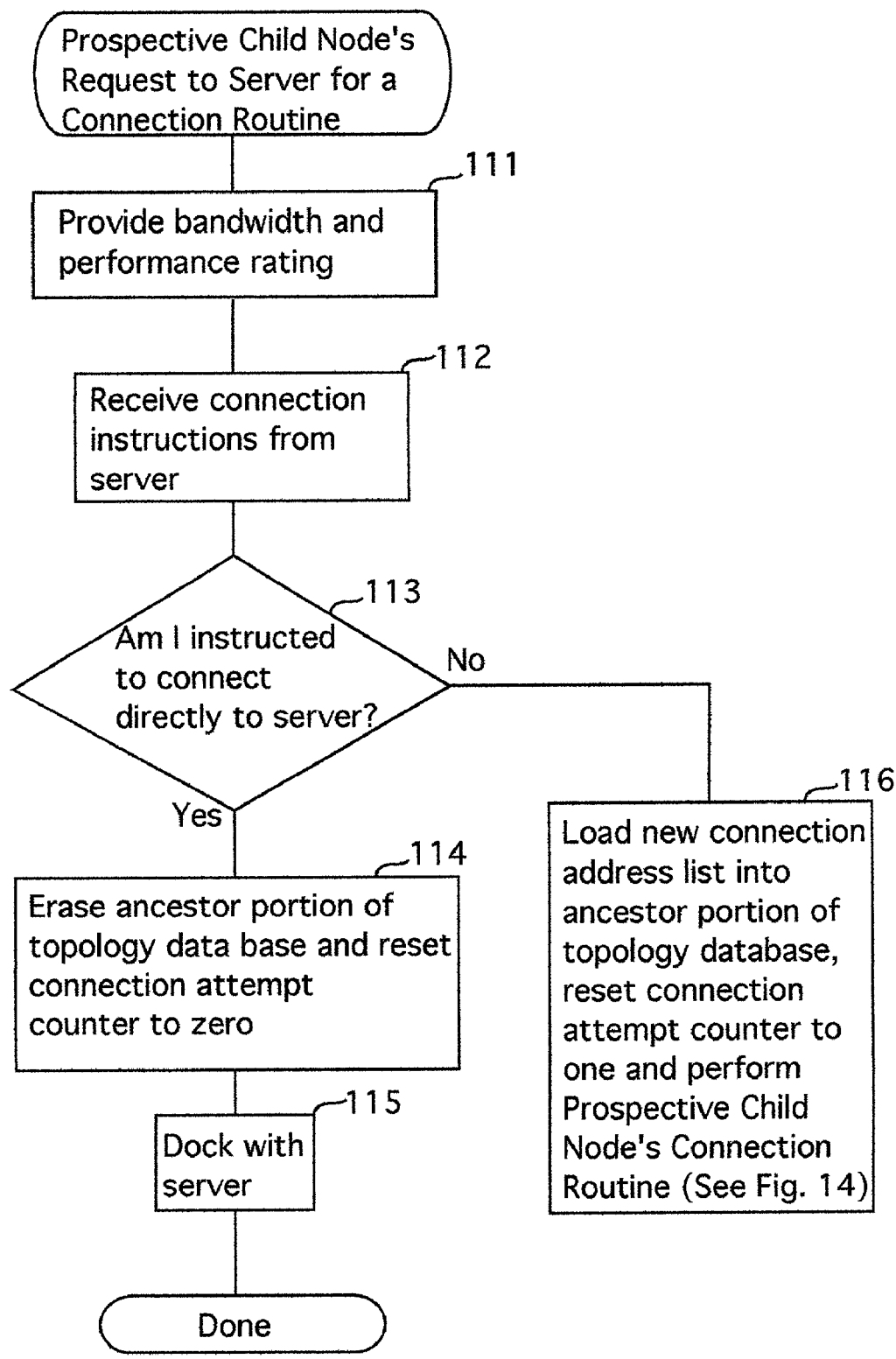
FIG. 11 is a flow diagram showing the Prospective Child Node's Request to Server for a Connection Routine.

While the server is performing the Server's Connection Routine, the new user node (or connection requesting user node) is performing the Prospective Child Node's Request to Server for a Connection Routine. FIG. 11 is a flow diagram illustrating the Prospective Child Node's Request to Server for a Connection Routine. Upon making the temporary connection to the server, the new user node goes to step 111 in which it provides bandwidth rating and performance rating information to the server. It then proceeds to step 112 in which it receives connection instructions from the server. Then the new user node proceeds to step 113 to determine whether it has been instructed to dock directly with the server. If the answer is "yes," then the new user node proceeds to step 114 in which it erases any information which may have been in its ancestor database and, if the distribution software has a Return to Server Subroutine in it, resets the connection attempt counter to zero. The new user node then proceeds to step 115 in which it docks with the server and begins receiving streaming media or other data. If the new user node is not being instructed to dock directly with the server, then the new user node goes to step 116 in which it receives the new connection address list from the server and loads such list into the user node's ancestor database and begins the Prospective Child Node's Connection Routine (discussed below). If the distribution software has a Return to Server Subroutine in it, the connection attempt counter is reset to one in step 116.

In the examples discussed in connection with FIGS. 6–9 and 12A–12C, the server has determined that the new user node X will not be allowed to connect directly to the server. Also, all of the user nodes are presumed to be equally capable of simultaneously retransmitting two copies of the content data and that the tree rooted through node A is the most appropriate tree through which node X should be connected to the server. The server will rely on a chain length factor in determining to which particular user node, already in the distribution network, that node X should connect.

Figure 13:
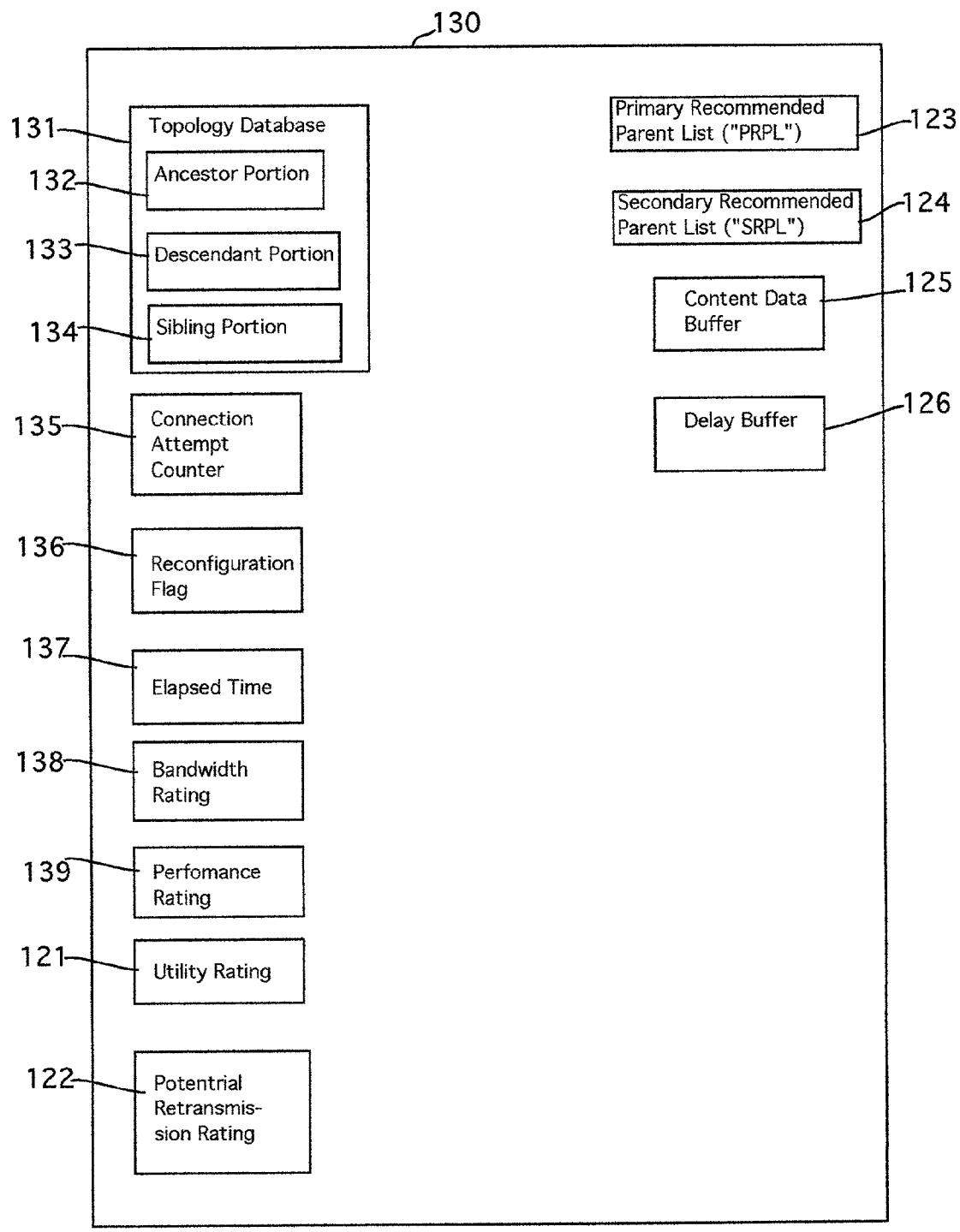
FIG. 13 is a block diagram showing the memory blocks into which the software used in connection with the present invention will partition a user node's memory.

FIG. 6 shows the topology of the distribution network based on the most recent information available to the server at the moment that node X seeks to join the distribution network. Path D-B-A-S (where "S" is the server) represents the shortest available path from an end of a chain back to the server, and the server 11 gives that path information, or connection address list, to node X during step 104 (and node X receives such list during step 116). That is, node X will be given a connection address list with the URLs or IP addresses of each of nodes D, B, A and S. The distribution software in node X causes the path information to be stored in the ancestor portion (or ancestor database) 132 of node X's topology database 131 shown in FIG. 13. The ancestor database includes an ancestor list, a list of node X's ancestors' addresses from node X's parent back to the server node. (FIG. 13 is a block diagram showing the memory blocks into which the software used in connection with the present invention will partition a user node's memory 130.) Node X then attempts to contact node D first, the user node most distant from server 11 in the path. Note that when the server provides the D-B-A-S connection address to node X, the server is giving what it "believes" to be the complete path information going all the way back to the server. That is, subsequent to the most recent generation of the topological data, node D may have departed from the network, as may have one or more of its ancestors, resulting in a reconfiguration (discussed below) of at least a portion of the tree of which D was a part.

Figure 7:
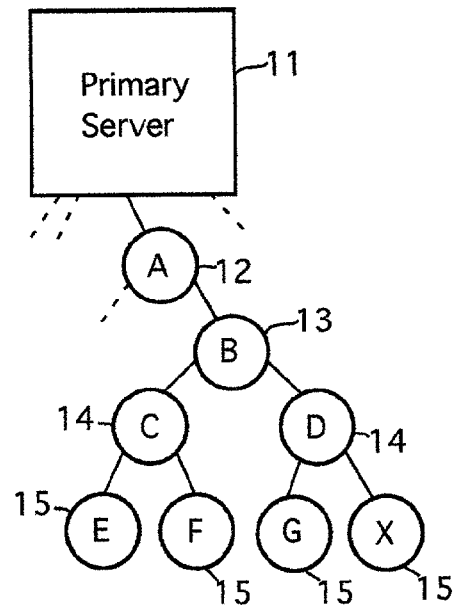
FIG. 7 is a schematic drawing of a particular topology of the computer information distribution network formed pursuant to the present invention as shown in FIG. 6 after the occurrence of an event.
Figure 14:
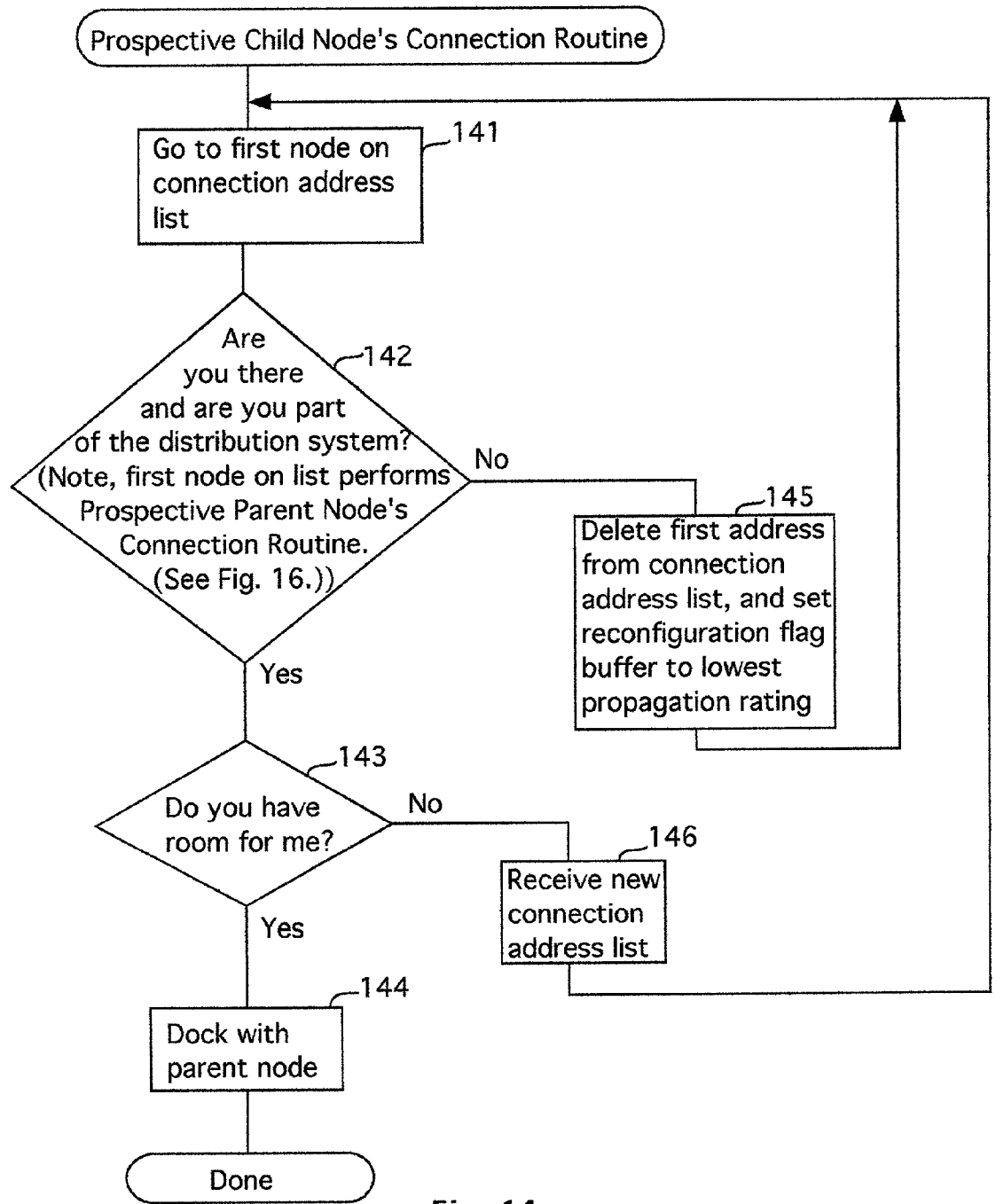
FIG. 14 is a flow diagram showing the Prospective Child Node's Connection Routine, the routine which a new user node (or connection requesting user node) will go through in attempting to connect to a distribution chain (or tree) after receiving an connection address list.

FIG. 14 is a flow diagram showing the Prospective Child Node's Connection Routine, the routine which a new user node, here node X, will go through in attempting to connect to a distribution chain (or tree) after receiving a connection address list (which node X has stored in the ancestor portion of its topology database) from the server or from a prospective parent node or during a reconfiguration event. In step 141, node X attempts to contact the first node on the connection address list. The first node, and only node, on the connection address list could be the server itself. Here node D is the first node on the list. Node X then proceeds to step 142 and determines whether the first node on the connection address list is still on line and still part of the distribution network. (If no response is received within a predetermined period of time, from the first node on the connection address list, the answer to the query in step 142 will be deemed to be no.) If node D is on line and still part of the distribution network, node X proceeds to step 143 in which node X inquires whether node D has room for node X. This inquiry is required because the distribution network may have gone through a reconfiguration event resulting in node D's not having sufficient capacity to provide a copy of the show data to node X. If node D has room for node X, then node X proceeds to step 144 in which it connects (or docks) with node D and begins receiving content data from it. This is depicted in FIG. 7. Note that node X is now one of several level four nodes 15.

Figure 8:
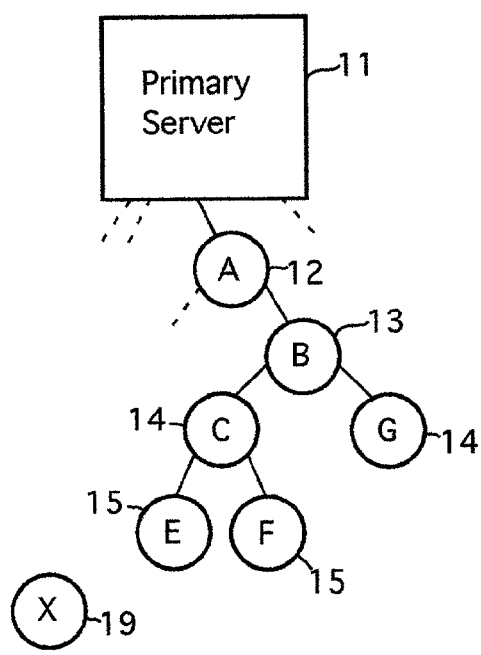
FIG. 8 is a schematic drawing of another topology of a computer information distribution network formed pursuant to the present invention.

In step 142, if node D is not on line (i.e., no response is received from node D within a predetermined period of time) or if node D is on line but is no longer part of the distribution system (i.e., subsequent to the server's obtaining its topology data the user of the system at node D either caused his or her computer system to go off line or to leave the distribution system, or there was a line failure causing the computer system to go off line), as depicted in FIG. 8, then node X goes to step 145 in which it deletes the first address from the connection address list in node X's ancestor database (and, for a purpose which will become clear when discussing reconfiguration events below, sets its reconfiguration flag buffer 136 to the lowest propagation rating). At this time node B, in the present example, becomes the first node on the connection address list. Then node X goes back to step 141 and repeats the routine described above. Note that because of node D's leaving the distribution network, a reconfiguration event was triggered which resulted in node G changing from a fourth level node 15 to a third level node 14.

In step 143, if the prospective parent node has no room for the new node (i.e., the capacity of the prospective parent node is fully occupied), the new node goes to step 146, in which it receives a new connection address list from the prospective parent. The prospective parent would perform a Fully Occupied Parent's Connection Instruction Routine, discussed below in connection with FIG. 18, wherein it creates the new connection address list based on topology data obtained from its progeny. That new list will include the path back to the server through the prospective parent just in case, as discussed above, there are user node departures all along the path.

By having a prospective parent node prepare the new connection address list, the burden on the server is reduced and is distributed among the user nodes.

Figure 9:
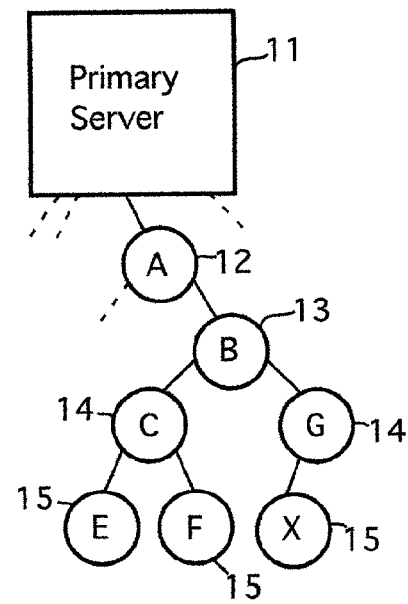
FIG. 9 is a schematic drawing of the topology of the computer information distribution network formed pursuant to the present invention as shown in FIG. 8 after the occurrence of an event.

In the example depicted in FIG. 8, when node X gets to step 143, node B will respond that it has no room and node X will proceed to step 146. When node X performs step 146, the new connection address list it receives from node B will be G-B-A-S. Then node X proceeds to step 141 and repeats the routine from that point on. When the routine is performed on the topology shown in FIG. 8, step 143 will result in node G responding that it has room for node X. Node X will then perform step 144 and be connected to the distribution network through node G as shown in FIG. 9. Here, node X becomes a fourth level node 15.

Figure 15:
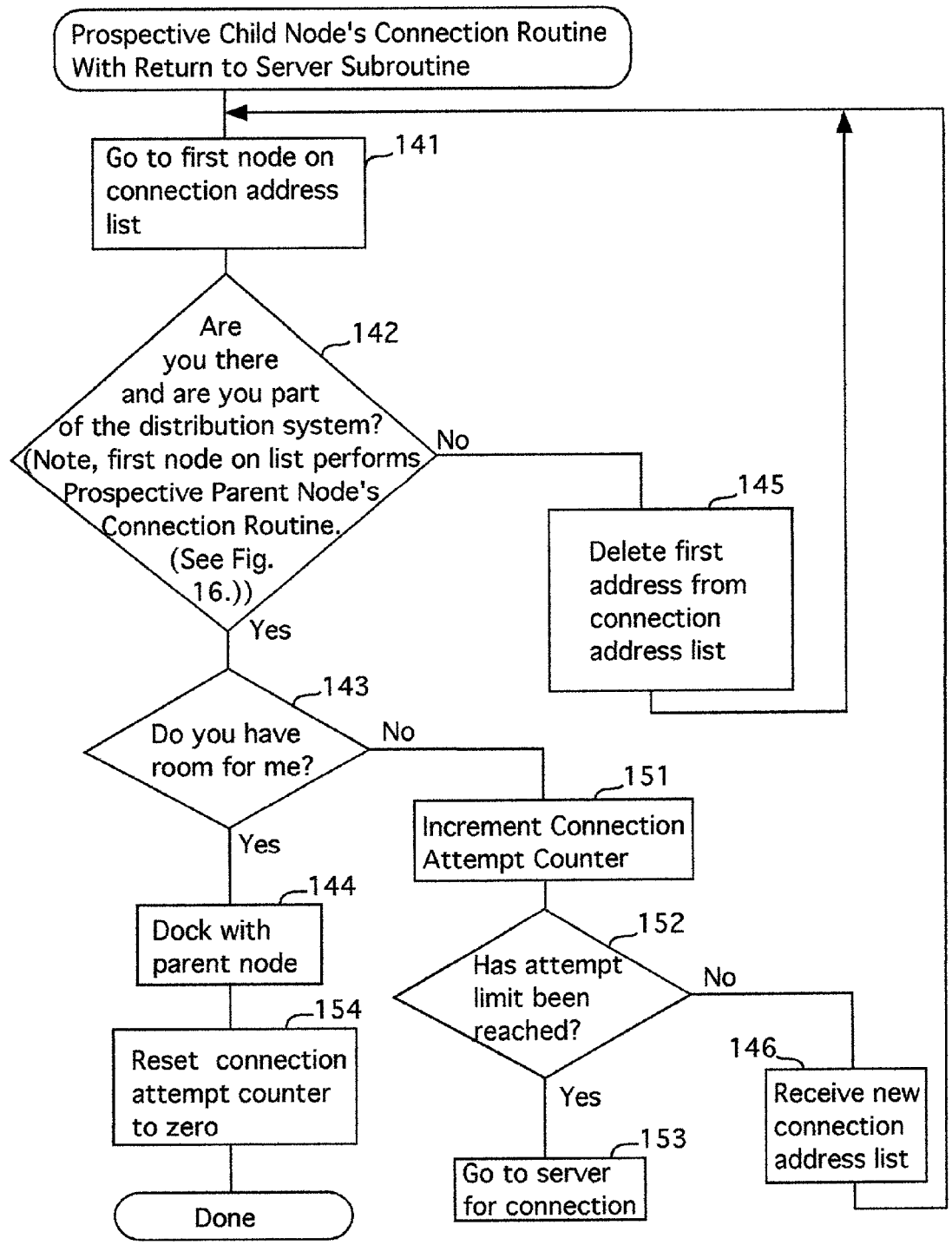
FIG. 15 is a flow diagram showing the Prospective Child Node's Connection Routine With Return to Server Subroutine.

The distribution software may include a Return to Server Subroutine, comprised of steps 151, 152 and 153 as shown in FIG. 15, as part of the Prospective Child Node's Connection Routine. This subroutine reduces the risk that a prospective child node would enter into an endless cycle of fruitless attempts to dock with nodes in a particular tree. If the answer to the query in step 143 is "no," then node X goes to step 151 in which it increments by one the connection attempt counter 135 in node X's memory. Then node X goes to step 152 in which it determines whether the connection attempt limit has been reached. The limit may be preset at any number greater than one and will depend upon what the designer of a particular distribution network determines would be a reasonable amount of time for a node to attempt to make a connection on a particular tree, or a branch of a tree, before that node should be given an opportunity to obtain a completely new connection address list directly from the server. If the connection attempt limit has not been reached, then node X proceeds with step 146 as discussed above. If the connection attempt limit has been reached, then node X goes to step 153, in which it goes back to the server and begins the connection routine again as discussed above in connection with FIG. 6. If docking with a parent node is successful, then after step 144 node X performs step 154 in which the connection attempt counter is set to zero.

Figure 16:
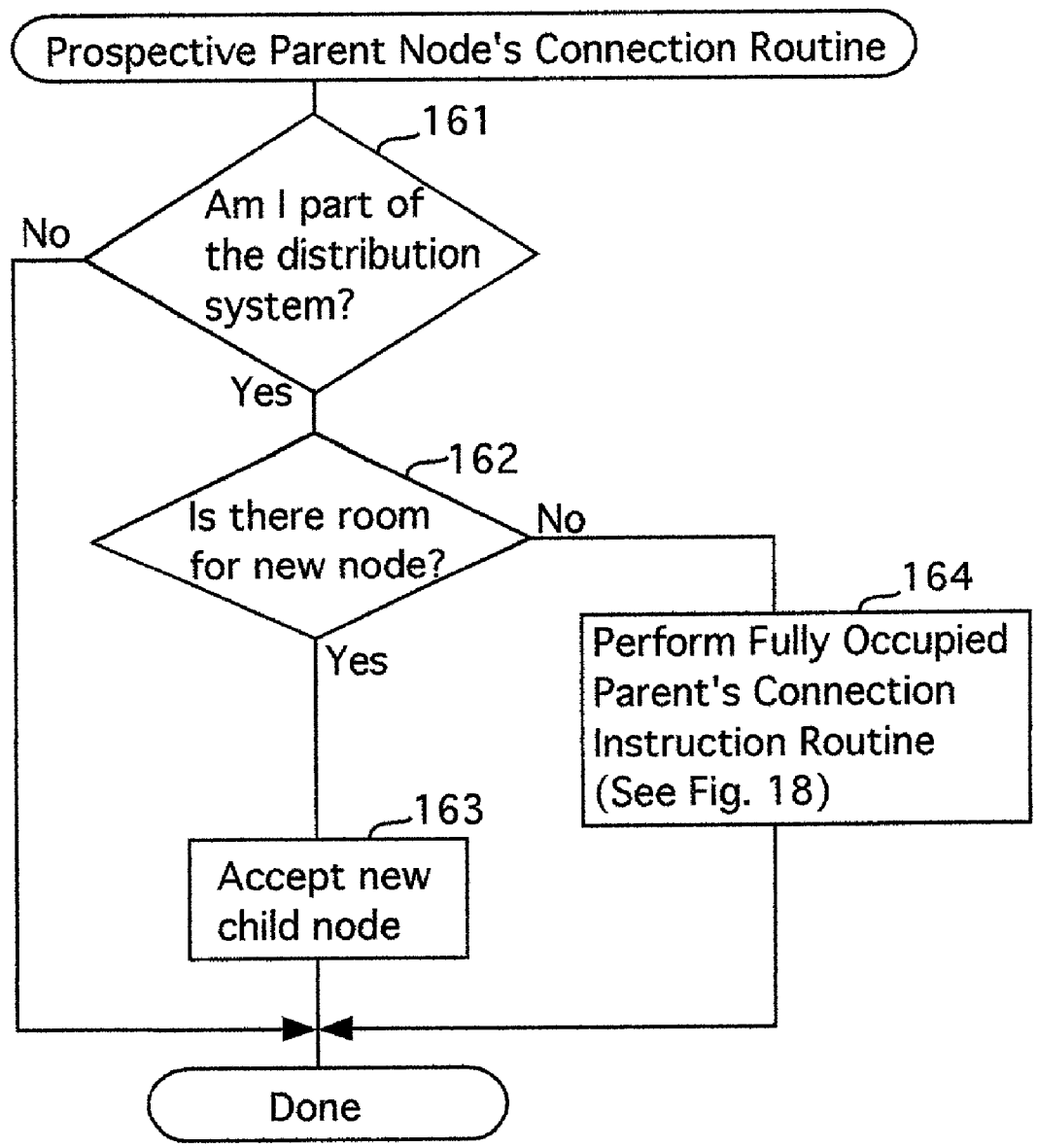
FIG. 16 is a flow diagram illustrating the Prospective Parent Node's Connection Routine.

FIG. 16 is a flow diagram illustrating the Prospective Parent Node's Connection Routine. Using the example illustrated in FIGS. 6, 8 and 9, when node X queries node B in step 142 during the Prospective Child Node's Connection Routine, node B begins performing the Prospective Parent Node's Connection Routine. In step 161, in response to node X's query, node B determines whether it is part of the distribution system node X seeks to join. If node B were not part of the distribution network, it would respond in the negative to node X's query and node B would be finished with the Prospective Parent Node's Connection Routine. In the example of FIG. 8, the answer is "yes" and node B proceeds to step 162.

In step 162 node B determines whether it has room for a new node. If the answer were "yes," node B would proceed to step 163 where it would allow node X to dock with it, and node B would begin transmitting to node X streaming media (or other data) originating from the server. In the example illustrated in FIG. 8, the answer is "no," and node B, acting as an instructing node, goes to step 164 where it performs the Fully Occupied Parent's Connection Instruction Routine (discussed below) and provides the prospective new child node (here node X) with a new connection address list. As noted above, the new connection address list will include the path back to the server through the node B (the prospective parent in this example) in the event that there are user node departures along the path, which departures include node B.

After performing step 164 the temporary connection between node B and node X is terminated, and node X is sent on its way. In the example of FIGS. 8 and 9, the new connection address list is G-B-A-S. When node X approaches node G, node G performs the Prospective Parent Node's Connection Routine discussed above. In the example illustrated in FIGS. 8 and 9, node G allows node X to dock with it.

Distribution Network Construction

As indicated above, the length of the distribution chains (i.e., the number of levels of user nodes linked through each other to the server) should be kept as small as possible.

Assuming that all new user nodes have the same retransmission capability (or disregarding the different retransmission capabilities which different new user nodes may have), the user nodes would be distributed through the first level until all the direct connection slots to the server were filled. Then as new user nodes sought connection to the distribution network, they would be assigned to connections with the first level nodes 12 until all the slots available on the first level nodes were filled. This procedure would be repeated with respect to each level as more and more new user nodes attempted to connect to the distribution network. In other words, the server, acting as an instructing node, would perform a Server's Connection Instruction Routine in which one step is determining whether there is room on the server for a new user node and, if so, the server would instruct the new user node to connect directly to the server. If there were no room on the server, then the server would perform the step of consulting its network topology database and devising a connection address list having the fewest number of connection links to a prospective parent user node. After performing the Server's Connection Instruction Routine, the server would either allow the new user node to dock directly with the server or send the new user node on its way to the first prospective parent user node on the connection address list.

In the preferred mode of the invention, a partially occupied potential parent node in a particular level (i.e., a prospective parent node already having a child but still having an available slot for an additional child node) is preferred over unoccupied (i.e., childless) potential parent nodes on the same level. This helps to keep the number of interior nodes (i.e., the number of nodes retransmitting data) to a minimum.

Figure 12A:
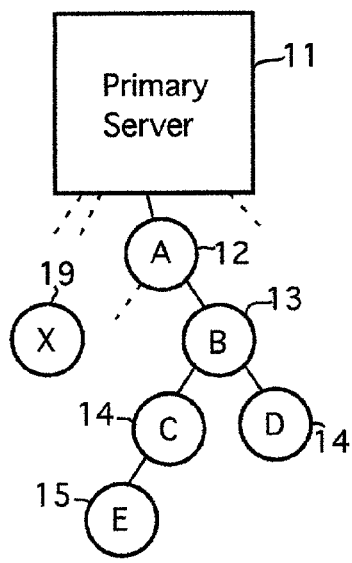
FIGS. 12A–12E are schematic drawings showing varying topologies of the computer information distribution network formed pursuant to the present invention under several circumstances.
Figure 12B:
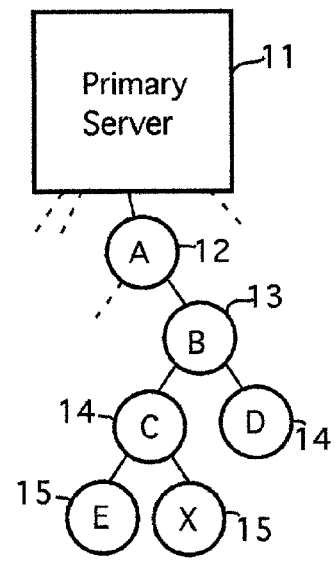
Figure 12C:
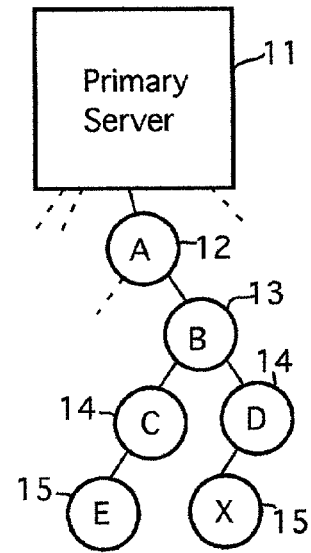

FIGS. 12A–12C illustrate an advantage to preferring a parent node to a childless node as a destination address for a new user node (assuming all other factors are equal). FIG. 12A is a schematic diagram showing a topology wherein nodes C and D, both third level nodes 14, have remaining capacity for one or more child nodes. Server 11 has the choice of sending new user node X to either node C, as shown in FIG. 12B, or node D, as shown in FIG. 12C, without increasing the length of the longest chain in the distribution network. However, user nodes are free to leave the distribution network at any time. With the topology shown in FIG. 12C, if either of nodes C or D leaves the network, there would be an effect on a child node. With the topology shown in FIG. 12B, there is a significant chance that if one of nodes C and D leaves the network, there would be no impact on any child nodes. That is, if it is node D that leaves the network, there is no child which would be made an orphan.

In discussing the examples illustrated in FIGS. 6–9 and 12A–12C, it has been presumed that all of the user nodes are equally capable of simultaneously retransmitting two copies of the content data. However, the user nodes actually joining a distribution network will have various capabilities for retransmitting data. Some will have no reliable capability because of hardware limitations. Other user nodes will have high nominal capability because of their hardware and type of Internet connection, but may have low reliability because of poor line conditions or the vagaries of the desires of the humans actually using the user nodes. For example, a user node having a T1 or faster connection to the Internet has a significantly large bandwidth, but is not reliable if the user (or viewer) is merely sampling the faire available on the distribution network.

As noted above, user nodes having the greatest reliable capability should be placed as high up in a distribution chain as possible because they would have the ability to support the greatest number of child nodes, grandchild nodes and so on.

To differentiate the reliable capabilities of user nodes, three factors are considered. One is time, that is, the number of seconds (or other units of time) since the node made its most recent connection to the network. Everything else being equal, a user node which has been continuously connected to the distribution network for a long period of time is likely more reliable (either because of line conditions or user interest) than a user node which has been continuously connected to the network for a short period of time.

Another factor is bandwidth rating, which may be determined by actual testing of the user node when it first attempts to connect to the server or a parent node or determined by the nominal bandwidth as determined by the type of connection made by the user node to the Internet. For ease of discussion, we will describe ratings based on nominal bandwidth.

A user node with a 56 Kbits/sec dialup modem connection to the Internet is essentially useless for retransmission of content data because of its small bandwidth. Such a node is assigned a bandwidth rating of zero (0.0).

A user node with a cable modem or DSL connection to the Internet is given a bandwidth rating of one (1.0) in a preferred embodiment because it is a common type of node and has a nominal outward transmission bandwidth, 128 Kbits/sec, which is large enough to potentially retransmit two acceptable quality copies of the content data it receives. Such capability fits well into a binary tree topology.

A full rate ISDN modem connection nominally has an inward reception bandwidth of 56 Kbits/sec and an outward transmission bandwidth of 56 Kbits/sec, which would potentially support acceptable quality retransmission of a single copy of the content data stream. For this reason, a user node with a full rate ISDN modem connection to the Internet is given a bandwidth rating of one-half (0.5) in a preferred embodiment of the invention, or half the rating of a user node connected to the Internet by a DSL or cable modem connection.

User nodes with T1 or greater links to the Internet should be able to support at least twice as many streams as DSL or cable modems, and are therefore given a bandwidth rating of two (2.0). In the event that in a distribution network parent nodes may be assigned more than two child nodes directly connected thereto, bandwidth ratings greater than 2.0 my be assigned to Internet connections having greater bandwidth than T1 connections.

A third factor is performance. A user node's performance rating is zero (0.0) if it is disconnected as a result of a Grandparent's Complaint Response Routine (discussed below in connection with FIG. 31). Otherwise, the user node's performance rating is one (1.0).

A user node's utility rating is determined by multiplying connection time by performance rating by bandwidth rating. That is, Utility Rating=Time×Performance Rating×Bandwidth Rating.

Information regarding a user node's time connected to the network, bandwidth rating, performance rating, utility rating and potential retransmission rating (discussed below) are stored in the user node's elapsed time buffer 137, bandwidth rating buffer 138, performance rating buffer 139, utility rating buffer 121 and potential retransmission rating buffer 122, respectively.

Figure 17:
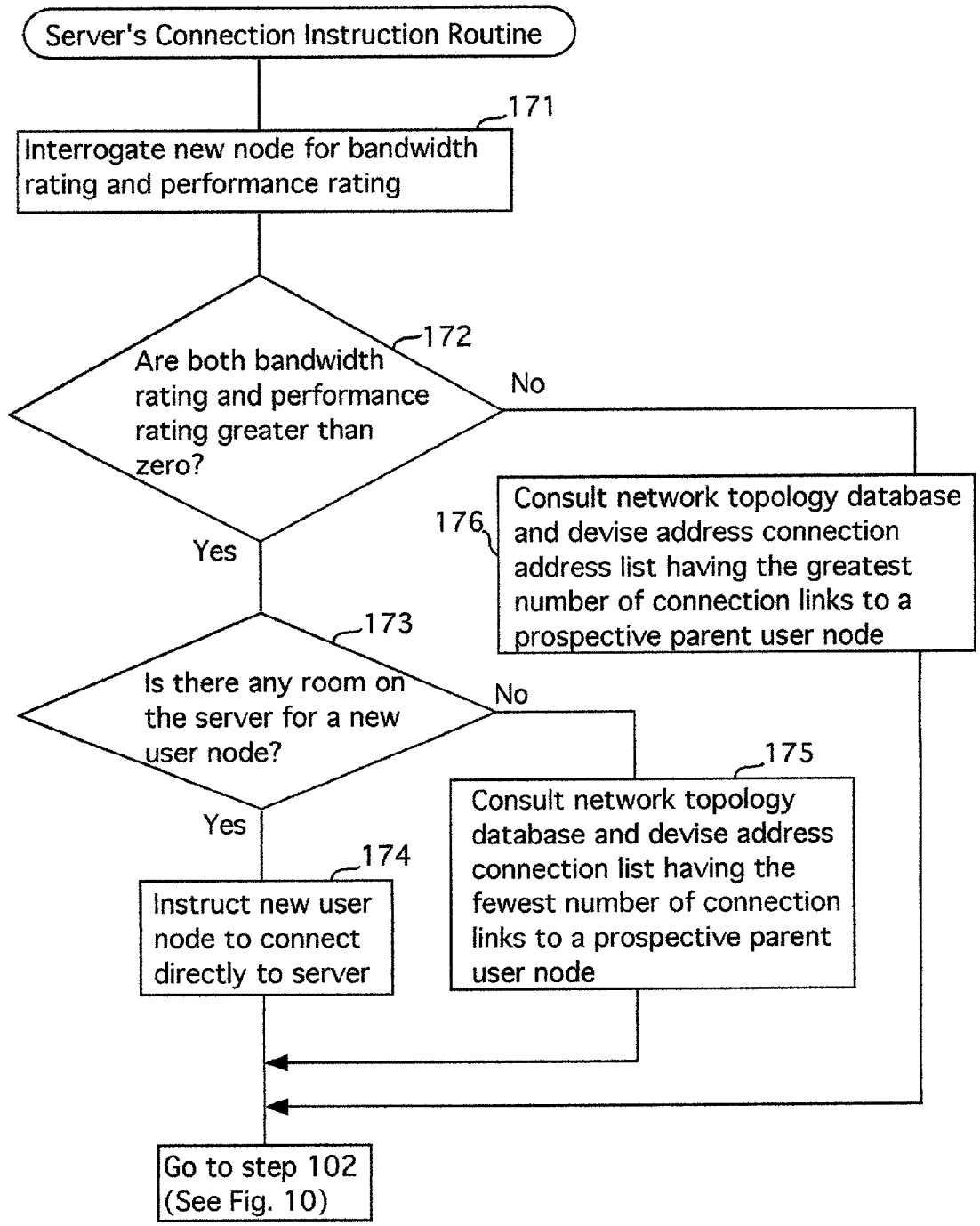
FIG. 17 is a flow diagram illustrating the Server's Connection Instruction Routine of a preferred embodiment of the invention.

FIG. 17 is a flow diagram illustrating the Server's Connection Instruction Routine of a preferred embodiment. While this routine need not rely on the new user node's utility rating, in a preferred embodiment it does rely on the potential retransmission rating of a user node, which is arrived at by multiplying the user node's performance rating by its bandwidth rating. That is, Potential Retransmission Rating=Performance Rating×Bandwidth Rating.

The server would want to put those user nodes with the highest potential retransmission rating as close to the server in a distribution chain as possible because they have the greatest likelihood of being able to retransmit one or more copies of content data. On the other hand, a potential retransmission rating of zero indicates that a user node has no ability to (or little expected reliability in) retransmitting even one copy of content data. The server would want to put a user node with a zero rating as far as reasonably possible from the server in a distribution chain. For the purpose of ease of discussion, in the flow diagram of FIG. 17 illustrating the Server's Connection Instruction Routine, the server is concerned about whether the potential retransmission rating is zero (i.e., either one or both of the performance rating and bandwidth rating is zero) or greater than zero (i.e., both the performance rating and the bandwidth rating are greater than zero).

In step 171 the server node interrogates the new user node (or connection requesting node) for its bandwidth rating and performance rating. If the new user node is really new to the distribution network, or if it has returned to the server because all of the user node's ancestor nodes have disappeared from the network, the new user node's performance memory will contain a performance rating of 1.0 (i.e., the default rating). However, if the new user node has been dispatched to the server for a new connection to the network because the new user node had failed to provide content data to one of its child nodes, then its performance memory will contain a performance rating of zero.

In step 172, the server determines whether the potential retransmission rate of the connection requesting node is greater than zero (i.e., whether both the bandwidth rating and the performance rating are greater than zero, or, if only the bandwidth rating is considered, whether the bandwidth rating is greater than zero (i.e., the connection requesting node is a high-bandwidth node)). If the answer is "yes," then the server goes to step 173 in which the server determines whether it has room for the new user node. If the answer to the query in step 173 is "yes," then the server goes to step 174 in which it instructs the new user node to connect directly to the server. Then the server goes to step 102 in the Server's Connection Routine.

If the answer to the query in step 173 is "no" (i.e., the server does not have the capacity to serve the new user node directly), then the server goes to step 175. In step 175, the server, acting as an instructing node, consults its network topology database and devises a connection address list having the fewest number of connection links to a prospective parent node. That is, the server checks its information regarding the nodes in the level closest to the server to determine whether there are any potential parent nodes with space available for the new user node. If there are no potential parent nodes with space available, then the database is checked regarding nodes in the level one link further from the server, and so on until a level is found having at least one potential parent node with space available for the new user node. That is, the server determines which parent node with unused capacity for a child node is closest to the server (i.e., in the highest level, with the first level being the highest), and devises the connection address list from such prospective parent node to the server. The server then goes to step 102 (shown in FIG. 10).

In another embodiment of the invention, the server could skip step 172 and go directly to step 173 (or it could go to step 172 and, if the answer to the query in step 172 is "no" (i.e., either one or both of the bandwidth rating and the performance rating are zero, or, if only the bandwidth rating is considered, whether the bandwidth rating is (i.e., the connection requesting node is a low-bandwidth node)), the server could go to step 175). However, this would prevent the server from loading up the highest levels of the distribution chains with nodes capable of retransmitting at least one acceptable copy of the content data. So, in the preferred embodiment of the Server's Connection Instruction Routine, the server does perform step 172 and does goes to step 176 if the answer to the query in step 172 is "no."

In step 176 the server consults its network topology database and devises a connection address list having the greatest number of connection links to a prospective parent node. That is, the server checks its information regarding the nodes in the level furthest from the server to determine whether there are any potential parent nodes with space available for the new user node. If there are no potential parent nodes with space available, then the database is checked regarding nodes in the level one link closer to the server, and so on until a level is found having at least one potential parent node with space available for the new user node. In this manner, user nodes having limited or no reliable retransmission capability are started off as far from the server as possible and will have a reduced effect on the overall capacity of the distribution network.

Figure 12D:
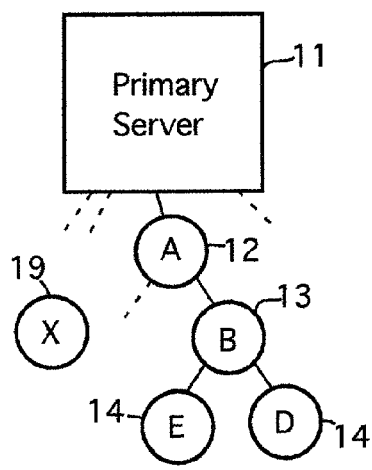

As indicated above, and as discussed more fully below, one or more reconfiguration events may have transpired since the server's topology database was last updated. As a result, the first prospective parent node which is actually present on the distribution network for the new user node to contact may not have room for the new user node. By way of example, when node X tries to join the distribution network having the topology shown in FIG. 12A, the server provides node X with the following connection address list: C-B-A-S. If node C had disappeared from the network between the last update of the server's topology database and node X's attempting to contact node C, then node E, by virtue of a reconfiguration event, would be connected to node B as shown in FIG. 12D. Then node X, in performing the Prospective Child Node's Connection Routine discussed in connection with FIGS. 14 and 15, would contact node B. Node B, in the Prospective Parent Node's Connection Routine, discussed in connection with FIG. 16, would have to answer the query of step 162 in the negative and go to step 164, in which it performs the Fully Occupied Parent's Connection Instruction Routine.

Figure 18:
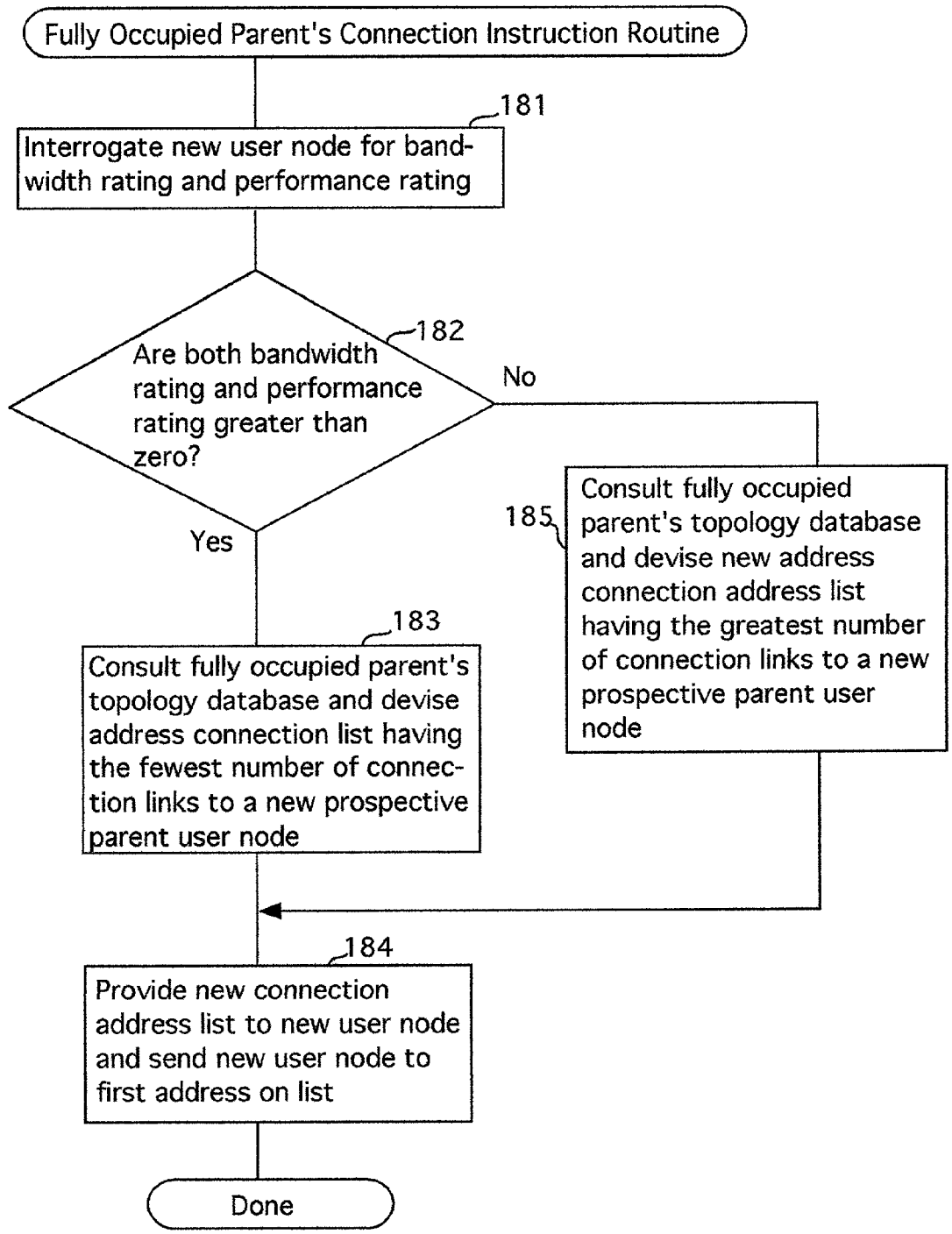
FIG. 18 is a flow diagram illustrating the Fully Occupied Parent's Connection Instruction Routine.

FIG. 18 is a flow diagram illustrating that routine. It is similar to the Server's Connection Instruction Routine. Since the fully occupied parent node has already determined that it has no room for the new user node (or connection requesting user node), the Fully Occupied Parent's Connection Instruction Routine does not need to include a step in which a determination is made regarding whether there is room for the new user node (or connection requesting node). In the Fully Occupied Parent's Connection Instruction Routine the fully occupied parent node, acting as an instructing node, first performs step 181 in which it interrogates the new user node for its bandwidth rating and performance rating. In step 182, the fully occupied parent node determines whether the potential retransmission rate of the new user node is greater than zero. (If only the bandwidth rating is considered, then it determines whether the bandwidth rating is greater than zero (i.e., the connection requesting node is a high-bandwidth node).) If the answer is "yes," then the fully occupied parent node goes to step 183 in which the fully occupied parent node consults its topology database, which contains the latest information available to that node regarding the links from the fully occupied parent node back to the server and regarding the fully occupied parent node's own progeny (i.e., its children, grandchildren etc.,) and devises a new connection address list having the fewest number of connection links to a new prospective parent node. That is, the fully occupied parent node checks its information regarding the nodes in the level closest to the fully occupied parent node (but not closer to the server) to determine whether there are any potential parent nodes with space available for the new user node. If there are no potential parent nodes with space available, then the database is checked regarding nodes in the level one link further from the fully occupied parent node (and further from the server), and so on until a level is found having at least one potential parent node with space available for the new user node. That is, the fully occupied parent node determines which new prospective parent node with unused capacity for a child node is closest to the fully occupied parent node, and devises the connection address list from such new prospective parent node through the fully occupied parent node and on to the server. The fully occupied parent node then goes to step 184 in which it provides the new user node with the new connection address list and disconnects the new user node from the fully occupied parent.

If the answer to the query in step 182 is no (i.e., either (i) one of the bandwidth rating and performance rating is zero or (ii) if only the bandwidth rating is considered, the bandwidth rating is zero (i.e., the connection requesting node is a low-bandwidth node)), the fully occupied parent node goes to step 185. In step 185 the fully occupied parent node consults its network topology database and devises a connection address list having the greatest number of connection links to a new prospective parent node. That is, the fully occupied parent node checks its information regarding the nodes in the level furthest from it (and farther from the server than it is) to determine whether there are any potential parent nodes with space available for the new user node. If there are no potential parent nodes with space available, then the database is checked regarding nodes in the level one link closer to the fully occupied parent node, and so on until a level is found having at least one potential parent node with space available for the new user node. As discussed above, this helps assure that new user nodes having limited or no reliable retransmission capability are started off as far from the server as possible. After the fully occupied parent node devises the connection address list from such new prospective parent node through the fully occupied parent node and on to the server, the fully occupied parent node then goes to step 184 where it performs as discussed above.

In another embodiment of the invention, the distribution software could be designed such that a fully occupied parent enters performs an abbreviated Fully Occupied Parent's Connection Instruction Routine, in which steps 181, 182 and 185 are not performed. That is, it could be presumed that the server has done the major portion of the work needed to determine where the new user node should be placed and that the fully occupied parent user node need only redirect the new user node to the closest available new prospective parent. In such event, only steps 183 and 184 would be performed.

In the example discussed above in which node C had disappeared from the network when new user node X had been given, by the server, connection address C-B-A-S, and in which node B is a fully occupied parent node as shown in FIG. 12D, node B would appear to have the choice of devising either connection address list D-B-A-S or E-B-A-S regardless of whether the full or abbreviated Fully Occupied Parent's Connection Instruction Routine were performed.

Figure 19:
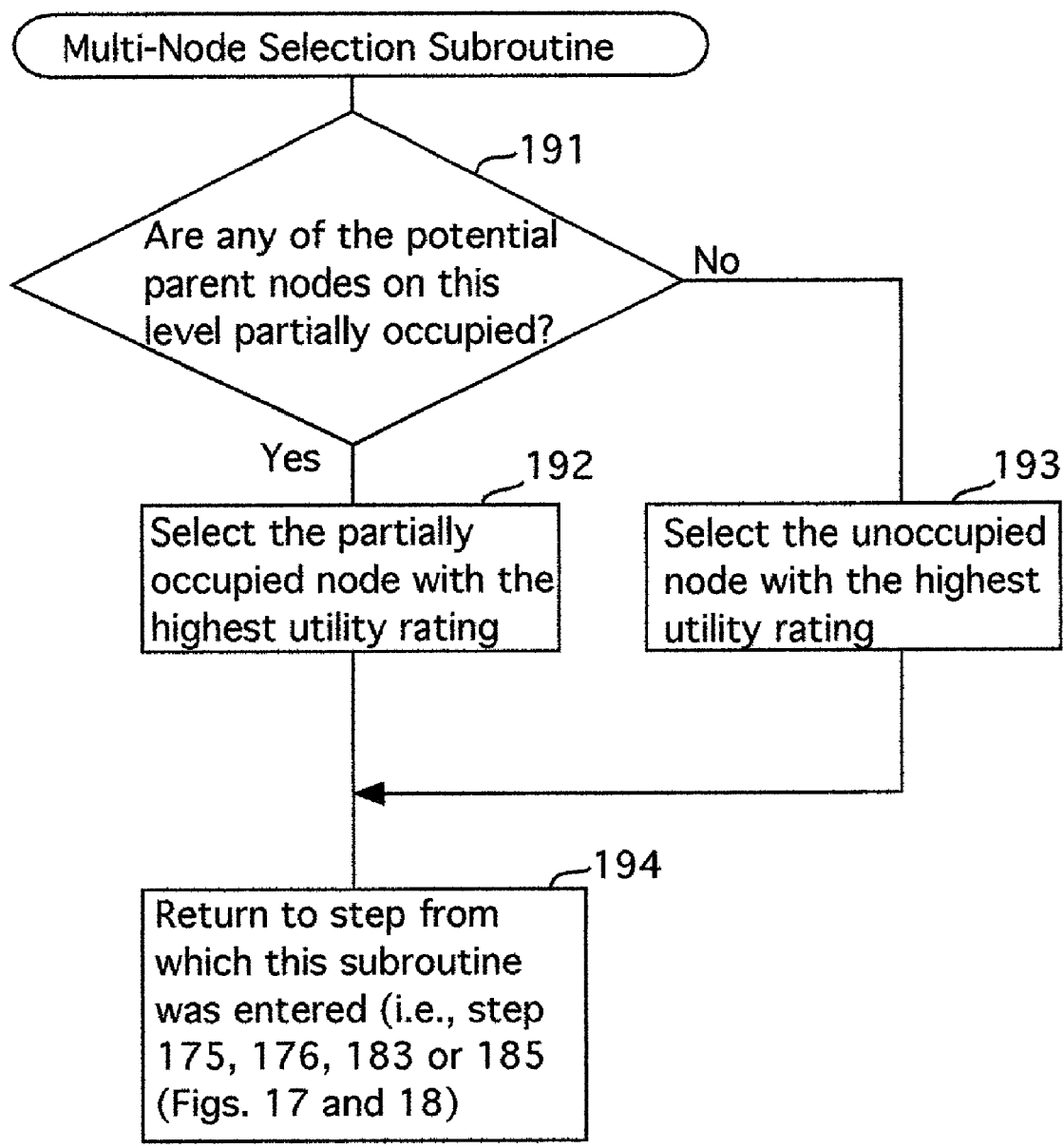
FIG. 19 is a flow diagram illustrating the Multi-Node Selection Subroutine.

To determine which connection address list to choose when there are two or more prospective parent nodes in a particular level having space for a new user node, the distribution software would have an additional subroutine as part of steps 175, 176, 183 and 185. This subroutine, called the Multi-Node Selection Subroutine is illustrated in FIG. 19.

In step 191 the server or fully occupied parent node deciding where to send a new user node determines whether any of the potential new parent nodes is partially occupied. As discussed earlier, a partially occupied potential parent node is preferred over an unoccupied potential parent node. If any of the potential parent nodes is partially occupied, then the server or fully occupied parent node goes to step 192. In step 192 the partially occupied prospective parent node with the highest utility rating is selected as the new prospective parent node. If there were only a single partially occupied potential parent node, then that node is selected.)

If in step 191 it is determined that there are no partially occupied potential parent nodes, then the then the server or fully occupied parent node goes to step 193. In step 193 the unoccupied prospective parent node with the highest utility rating is selected as the new prospective parent node.

(Note that as a matter of design choice, the software engineer could have step 193 follow an affirmative response to the query in step 191 and step 192 follow a negative response. In such event, unoccupied prospective parent nodes would be selected ahead of partially occupied prospective parent nodes.)

After whichever of steps 192 and 193 is completed, the server or fully occupied parent node returns to the step from which it entered the Multi-Node Selection Subroutine (i.e., step 175, 176, 183 or 185), and completes that step.

Figure 12E:
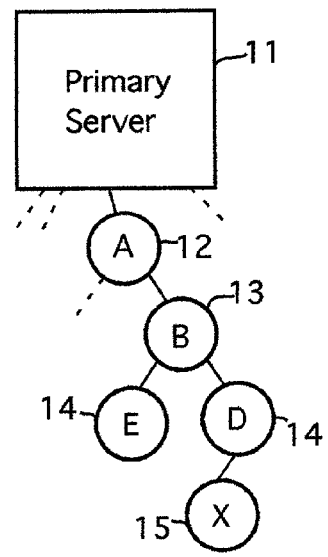

So, in the example shown in FIG. 12D, where node C left the network thereby leaving node B with the chore of devising a new connection address list for node X, node B would perform the Fully Occupied Parent's Connection Instruction Routine. Regardless of the bandwidth and performance ratings of node X, node B would be choosing between nodes D and E in the third level. In step 191 node B would determine that neither D nor E is partially occupied, and therefore node B would go to step 193. Assuming that nodes E and D have equal bandwidth and performance ratings and that node D was connected to the network longer than node E, node D would be selected because it would have the higher utility rating since it was connected to the network longer than node E. Node B would then go to step 194 and then return to the step from which it entered the Multi-Node Selection Subroutine. When node B returns to step 183 or 185, it completes that step and moves on to step 184. In that step, node B provides new user node X with new connection address list D-B-A-S and node X connects to the distribution network as shown in FIG. 12E.

Alternative Distribution Network Construction

It has already been established that it is preferred that the length of the distribution chains (i.e., the number of levels of user nodes linked through each other to the server) should be kept as small as possible.

It is also preferred that user nodes having the highest bandwidth capabilities should be closer to the server in order to allow the greatest expansion of the distribution system. However, it is inevitable that zero bandwidth rated nodes may appear further up in a chain (or tree), thereby stunting the growth of that tree. The following method may be used in constructing the distribution network both by servers and by prospective parents which are actually completely occupied, either of which may be thought of as an instructing node. (That is, software enabling the routines discussed below would be installed on servers and user nodes alike.)

In the distribution system, regardless of how it is constructed, each child node reports directly to (or is tested by) its parent node with respect to information relating to the child node's bandwidth rating, performance rating, potential retransmission rating and utility rating. In turn, each parent node reports all the information it has obtained regarding its child nodes on to its own parent node. (A parent node also reports to each of its child nodes the address list from that parent back to the server, which list forms what may be referred to as the ancestor portion of the topology database. In addition, a parent node reports to each of its child nodes the addresses of their siblings.) The reports occur during what may be referred to as a utility rating event. Utility rating events occur on a predetermined schedule, and may occur as frequently as every few seconds. As a result of all the reporting, each node stores in its topology database the topology of the tree (including all its branches) extending below that node, and the server stores in its topology database the topology of all the trees extending below it. This may be referred to as the descendant portion (or descendant database) 133 of the topology database. The descendant database a particular node includes a descendant list, a list of the addresses of all the nodes cascadingly connected below that particular node. Included in the topology database information are the utility ratings of the nodes below the node in which that particular topology database resides.

After each reporting event, each parent node (including the server), acting as an instructing node, devises two lists of prospective (or recommended) parent nodes. The first list, or Primary Recommended Parent List ("PRPL"), stored in the Primary Recommended Parent List buffer 123, lists all the nodes in the descendant portion of that node's topology database which have bandwidth available to support another child node. (In a preferred embodiment of a binary tree system, all nodes in the descendant portion of the topology database having (i) a bandwidth rating of at least one and (ii) less than two child nodes would be listed.) They would be listed with those node's which are closest to the node in which that particular topology database resides at the top of the list, and those nodes which are in the same level would be ranked such that the node with the highest utility rating would be listed first, the node with the second highest utility rating would be listed second and so on. By way of example, the PRPL of a second level node would list a third level node with available bandwidth ahead of a fourth level node with available bandwidth even if the fourth level node's utility rating were higher than that of the third level node.

The second list, or Secondary Recommended Parent List ("SRPL"), stored in the Secondary Recommended Parent List buffer 124, lists all the nodes in the descendant portion of that node's topology database which have the ability to retransmit content data to child nodes but are fully occupied, and at least one of its child nodes is incapable of retransmitting content data to another child node. (In a preferred embodiment of binary tree system, all nodes in the descendant portion of the topology database having (i) a bandwidth rating of at least one and (ii) at least one child node having a bandwidth rating less than one (i.e., being incapable of transmitting retransmitting content data to two child nodes) would be listed.) Like the nodes in the PRPL, the nodes in the SRPL would be listed with those node's which are closest to the node in which that particular topology database resides at the top of the list, and those nodes which are in the same level would be ranked such that the node with the highest utility rating would be listed first, the node with the second highest utility rating would be listed second and so on.

The SRPL lists those parent nodes having the growth of their branches (i.e., their further progeny) blocked or partially blocked by a low-bandwidth child node. This may lead to an unbalanced growth of the distribution system, and a limitation on the total capacity of the system.

To the extent that a node (including a server) has room for another child node or is the parent of a low bandwidth node, it would be listed on its own PRPL or SRPL.

Figure 20A:
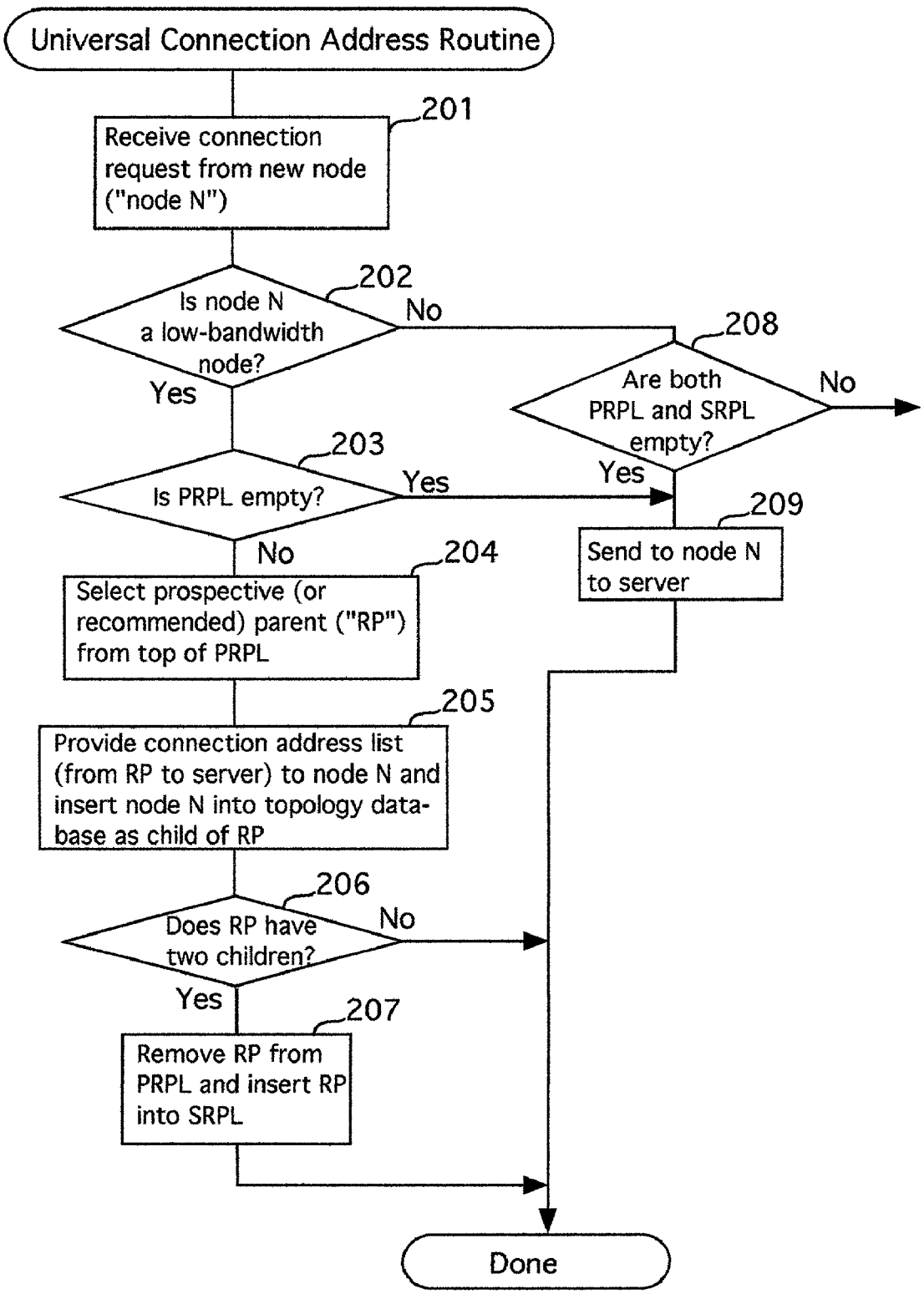
FIGS. 20A and 20B are together a flow diagram illustrating the Universal Connection Address Routine.
Figure 20B:
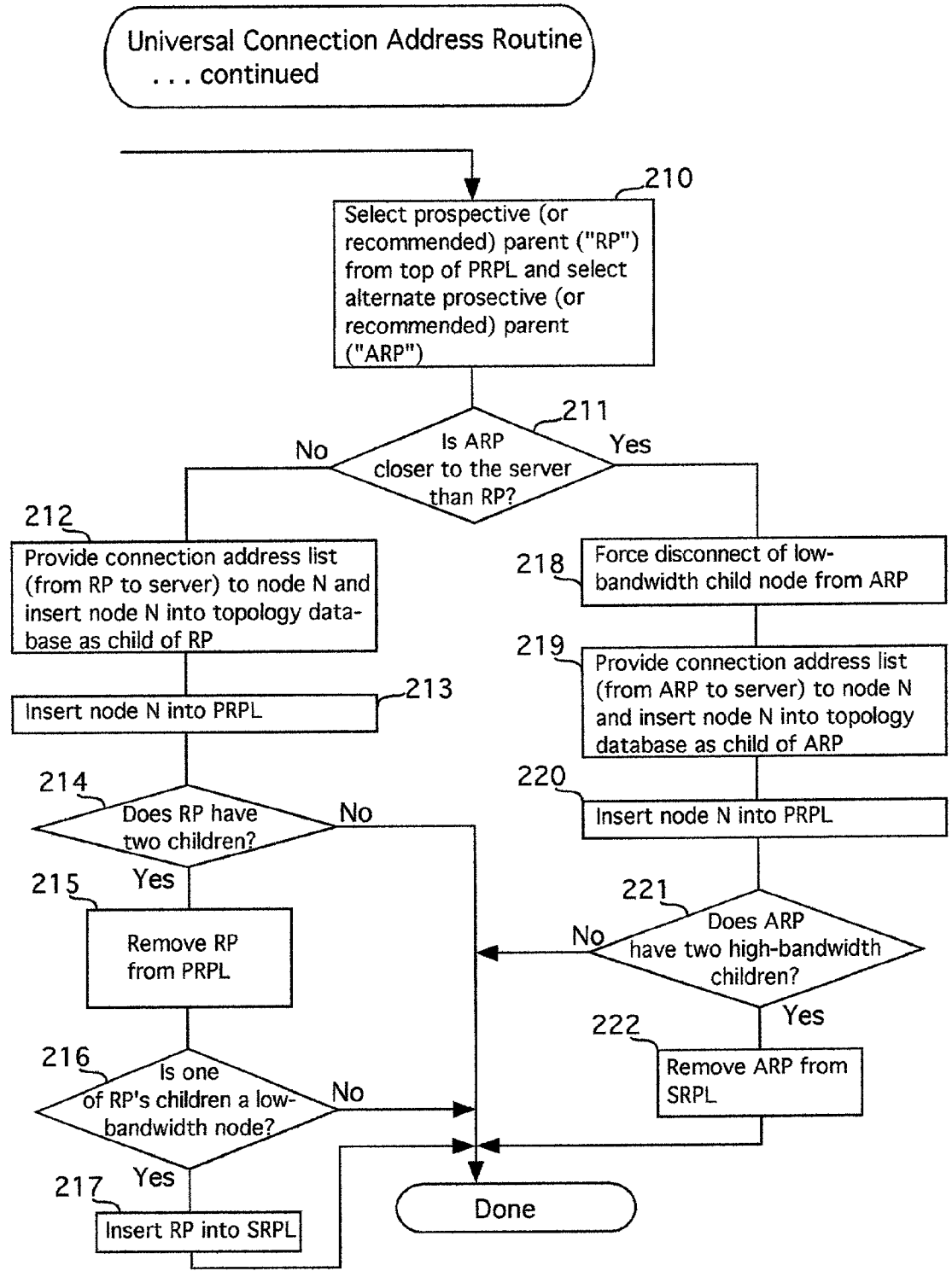

FIGS. 20A and 20B are together a flow diagram illustrating what may be referred to as the Universal Connection Address Routine. As indicated above, a server or a fully occupied prospective parent node receiving a connection request may be referred to as an "instructing node." When a new node (here node N) approaches an instructing node, the instructing node performs step 201, it receives a connection request. It then goes to step 202 in which it interrogates or tests node N to determine whether it is a low-bandwidth node. In the binary tree system of the preferred embodiment, a low-bandwidth node is a node with a bandwidth rating less than one. If node N is a low bandwidth node, the instructing node proceeds to step 203 in which the instructing node determines whether there are any available prospective parent nodes which are not fully occupied. Sometimes the distribution network may be fully occupied. If it is, the instructing node's PRPL will be empty. If it is empty, the response to the query in step 203 would be yes. Then the instructing node goes to step 209 in which the new node is sent back to the server to start the connection process from the beginning. If the response to the query in step 203 is no, then the instructing node goes to step 204 in which it selects a prospective (or recommended) parent node for node N. The instructing node then moves on to step 205 in which it consults its topology database and devises a connection address list from the recommended parent node back to the server, and provides such connection address list to node N. (If the instructing node is a user node, then the connection address list leads back to the server through the instructing node.) At this point, node N performs the Prospective Child Node's Connection Routine discussed above in connection with FIG. 14.

As part of step 205, the instructing node inserts node N into its topology database as a child of the recommended parent node. It does this because other new nodes may seek connection instructions prior to the next utility rating event (i.e., before reports providing updated information regarding the topology of the distribution network are received by the instructing node), and such new nodes should not be sent to a prospective parent which the instructing node could know is fully occupied. In this regard, the instructing node then goes to step 206 in which it checks its topology database to determine whether the recommended parent, with node N presumptively docked to it as a child node, is fully occupied (in the example here of a binary tree network, whether it has two child nodes). If the answer is no, then the instructing node has finished this routine. If the answer is yes, then the instructing node goes to step 207 in which it removes the recommended parent from the PRPL and inserts it into the SRPL, and the instructing node has finished the routine.

If the answer to the query in step 202 is no (i.e., node N is not a low-bandwidth node; in the binary tree network of the preferred embodiment it is a high-bandwidth node capable of retransmitting content data to two child nodes), the instructing node moves on to step 208. There it determines whether both the PRPL and SRPL are empty (which may occur under certain circumstances, such as when the number of levels in a distribution system is capped and at least all the nodes on all but the last level are fully occupied with high-bandwidth nodes). If so, the instructing node goes to step 209 in which the new node is sent back to the server to start the connection process from the beginning. If the response to the query in step 208 is no, then the instructing node goes to step 210 in which it selects a prospective (or recommended) parent node for node N from the PRPL and an alternate recommended parent node from the SRPL. (If either the PRPL or SRPL is empty, the instructing node will make a "nil" selection from that list. The instructing node knows from step 208 that at least one of the lists will not be empty.) The instructing node then goes to step 211 in which it determines whether the alternate recommended parent node is closer to the server (i.e., on a higher level) than the recommended parent node derived from the PRPL. If the alternate recommended parent node is on the same level as, or on a lower level than the recommended parent node derived from the PRPL (or if the selection from the SRPL is nil), then the answer to the query in step 211 is no.

In such event, the instructing node goes to step 212 in which it consults its topology database and devises a connection address list from the recommended parent node back to the server, and provides such connection address list to node N. (If the instructing node is a user node, then the connection address list leads back to the server through the instructing node.)

As in step 205 discussed above, at this point, node N performs the Prospective Child Node's Connection Routine discussed above in connection with FIG. 14, and in step 212, the instructing node inserts node N into its topology database as a child of the recommended parent node.

The instructing node moves to step 213 in which it adds node N to an appropriate position on the PRPL. It does this because, as a result of step 202, it knows that the node N is capable of retransmitting content data to its own child nodes.

The instructing node then goes to step 214 in which it checks its topology database to determine whether the recommended parent, with node N presumptively docked to it as a child node, is fully occupied (in the example here of a binary tree network, whether it has two child nodes). If the answer is no, then the instructing node has finished this routine. If the answer is yes, then the instructing node goes to step 215 in which it removes the recommended parent from the PRPL because it is now deemed to not be an available prospective parent node.

Then the instructing node goes to step 216 in which it consults its topology database to determine whether any of the recommended parent node's children is a low-bandwidth node. (In this example, knowing that node N is not a low-bandwidth node and knowing that the recommended parent node has two child node's, the question is whether the child node other than node N is a low-bandwidth node.) If the answer is no (i.e., all the recommended parent node's children are high-bandwidth nodes), then the instructing node has finished the routine.

If the answer is yes, then the growth of the recommended parent node's line of progeny is partially blocked by a low-bandwidth child node. The instructing node moves on to step 217 in which it adds the recommended parent to the SRPL.

If the answer to the query in step 211 is yes (i.e., the alternate recommended parent (selected from the SRPL) is (i) on a higher level than the recommended parent (selected from the PRPL) or (ii) the selection from the PRPL is nil), then the instructing node moves to step 218. In that step the instructing node consults its topology database to determine (i) which of the alternate recommended parent node's child nodes is a low-bandwidth node or (ii) if they both are low-bandwidth nodes, which of the child nodes has been connected to the system a shorter period of time, and sends a disconnect signal to that child node with instructions to return to the server to start the connection process from the beginning (as a new user node (or connection requesting user node)).

The instructing node moves on to step 219 in which it consults its topology database and devises a connection address list from the alternate recommended parent node back to the server, and provides such connection address list to node N. (If the instructing node is a user node, then the connection address list leads back to the server through the instructing node.)

As in steps 205 and 212 discussed above, at this point, node N performs the Prospective Child Node's Connection Routine discussed above in connection with FIG. 14, and in step 219, the instructing node inserts node N into its topology database as a child of the alternate recommended parent node.

The instructing node moves to step 220 in which it adds node N to an appropriate position on the PRPL. It does this because, as a result of step 202, it knows that the node N is capable of retransmitting content data to its own child nodes.

The instructing node then goes to step 221 in which it checks its topology database to determine whether all the child nodes of the alternate recommended parent are high-bandwidth nodes. If the answer is no, then the instructing node has finished this routine. If the answer is yes, then the instructing node goes to step 222 in which it removes the alternate recommended parent from the SRPL because it is now deemed to not be an available alternative prospective parent node since the growth of its progeny line is not even partially blocked by one of its own children. At this point the instructing node has finished the routine.

With the routines discussed above, the distribution network will be built with each new node assigned to the shortest tree (or chain), and those with the fewest number of links between it and the server. However, low-bandwidth nodes, which would tend to block the balanced growth of the distribution network, would be displaced by high-bandwidth nodes and moved to the edges of the network where they would have reduced effect on the growth of the network.

Figure 21:
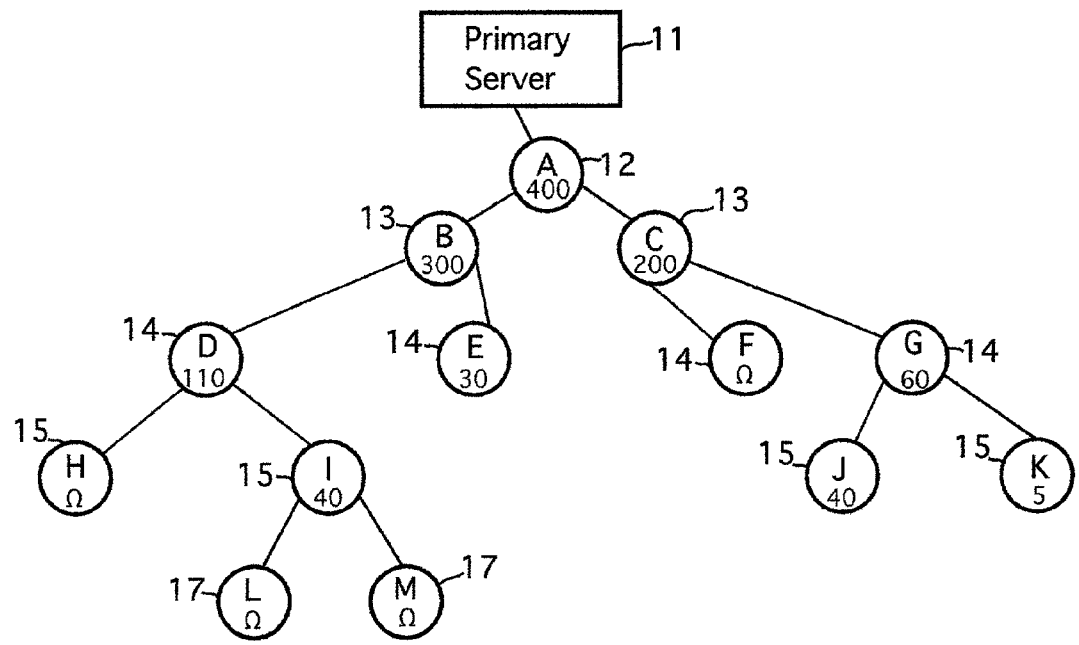
FIG. 21 is a schematic drawing of a topology of the computer information distribution network before a new node will be added using the Universal Connection Address Routine.

FIG. 21 may be used to illustrate how the Universal Connection Address Routine works. It shows primary server 11 with node A as first level node 12, its child nodes B and C as second level nodes 13, their child nodes D, E, F and G as third level nodes 14, node D and G's child nodes H, I, J and K as fourth level nodes 15, and node I's child nodes L and M as fifth level nodes 17. Assume for this example that all available docking links directly to the server 11 are occupied by high-bandwidth nodes, and that all trees are at full capacity other than that rooted to the server 11 through first level node A. The utility rating for each node is set forth in FIG. 21 under its letter designation. Low-bandwidth nodes (here, those nodes having a bandwidth rating less than one) are shown with a bandwidth rating of "Ω," which indicates that in the preferred embodiment illustrated here that such nodes will not have any child nodes assigned to them. Nodes A, B, C, D, E, G, I, J and K are high-bandwidth nodes (or repeater nodes (i.e., they are capable of retransmitting the content data they receive from their respective parent nodes to their respective child nodes, if any)).

A new user node (or other connection requesting user node) (here referred to as "node N") may be directed to node A as a result of various reconfiguration events. When node A receives a connection request from node N, node A will either consult both of its PRPL and SRPL buffers, if node N is a high-bandwidth node, or consult just its PRPL buffer (if node N is a low-bandwidth node).

Nodes F, H, L, and M will not appear on any list since they are low-bandwidth nodes. Nodes B, C, D, G, I and A itself will not appear on the PRPL since these nodes are fully occupied. However, nodes C, D, and I will appear on the SRPL because they each have at least one low bandwidth child node.

Using the rules discussed above (i.e., ranking prospective parent nodes by level and within levels by utility rating) the PRPL would be as follows:

PRPL
E (a third level node with available capacity)
J (the fourth level node with available capacity having the highest utility rating)
K (a fourth level node with available capacity)

The SRPL would be as follows:
SRPL
C (the fully occupied second level node with a low-bandwidth child node)
D (the fully occupied third level node with a low-bandwidth child node)
I (the fully occupied fourth level node with a low-bandwidth child node)

If node N is a low-bandwidth node, node A will give node N the following as its new connection address list:
E-B-A-S.

Since node E would not have two child nodes, it would remain on the PRPL.

If node N is a high-bandwidth node, node A will compare (step 211) the first node on the PRPL (the recommended parent node) with the first node on the SRPL (the alternate recommended parent node). Here, node C, the first node on the SRPL is a higher level node than node E, the first node on the PRPL. So, node A will send a disconnect signal (step 218) to node F, node C's low-bandwidth child node. Then it will provide node N with the following new connection address list and add node N to the PRPL (step 219):
C-A-S.

Since node C would now have two high-bandwidth child nodes (nodes N and G), node C would be removed from the SRPL (step 222).

Further in this example wherein node N is a high-bandwidth node, when node F returns to the server 11 for a new connection, the server will also use the Universal Connection Address Routine. Since node F is a low-bandwidth node, the server will give node F the following as its new connection address list:
E-B-A-S.

Figure 22:
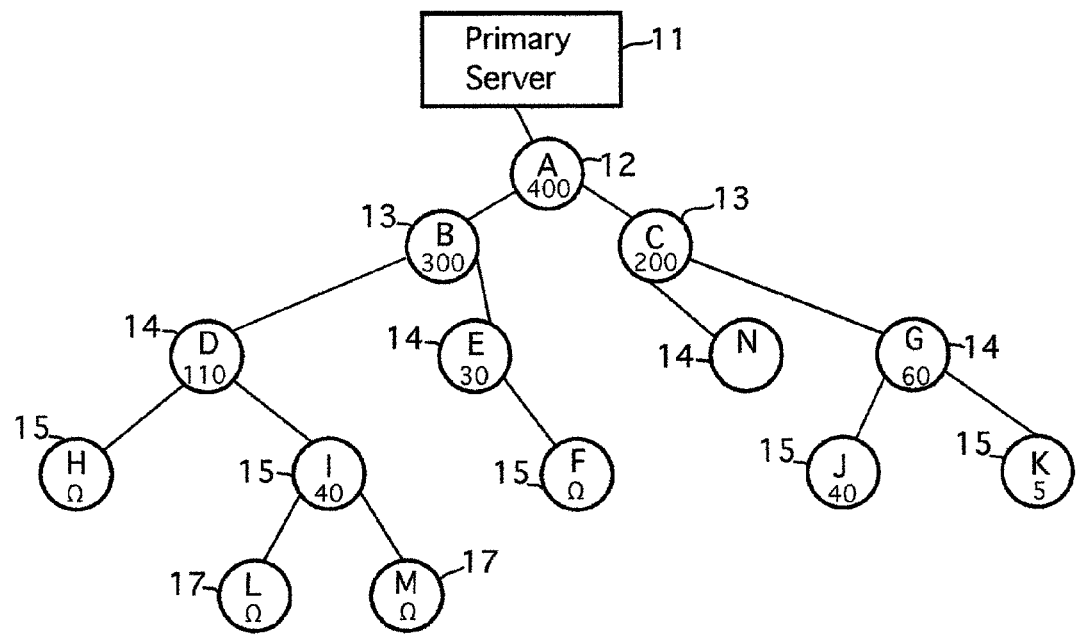
FIG. 22 is a schematic drawing of the topology of the computer information distribution network when a new node is added using the Universal Connection Address Routine.

FIG. 22 illustrates the new topology. As can be seen, absent intervening events, low-bandwidth node F will end up moving down from the third level to the fourth level and the bandwidth capacity of the third level will increase from six child nodes to eight (its maximum in this binary tree example). The potential bandwidth capacity of the fourth level would also increase, from ten child nodes to twelve.

Distribution Network Reconfiguration

User nodes are free to exit the distribution network at will. And, of course, user nodes may exit the distribution network due to equipment failures between the user node and the communication network (the Internet in the examples discussed herein). This was first discussed in connection with FIGS. 10A–E.

Figure 23:
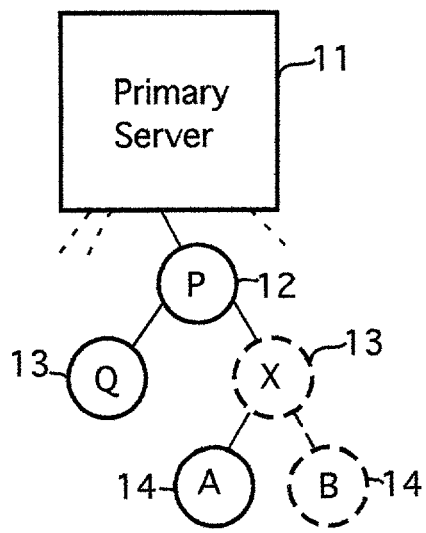
FIG. 23 is a schematic drawing of a topology of the computer information distribution network before a reconfiguration event.
Figure 24:
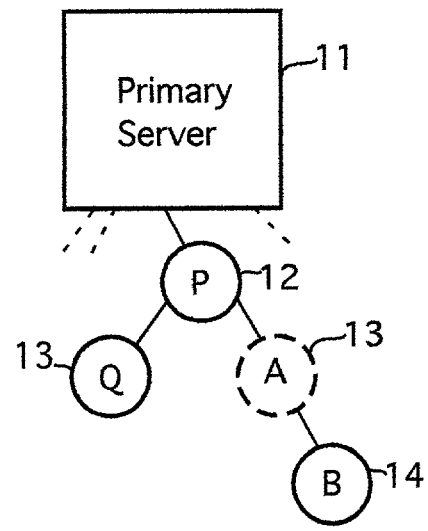
FIG. 24 is a schematic drawing of the topology of the computer information distribution network shown in FIG. 23 after a reconfiguration event.

The invention handles the reconfiguration required by a user node departure by having certain user nodes in the same tree as the departing node perform a Propagation Routine. The results of the propagation routine are illustrated in FIGS. 23 and 24. There a tree rooted to the server through first level user node P is illustrated. Node P has two child nodes, second level nodes Q and X. Through node X, P has two grandchild nodes, third level nodes A and B. Based on the relative utility ratings of nodes Q and X, P has sent signals to its children instructing them to set the color of the flag represented by the information in their respective reconfiguration flag buffers to "green" and "red," respectively. The use of colors as designators is merely discretionary. In reality they represent relative ratings of siblings for purposes of determining their roles in a reconfiguration event, and may be referred to as "propagation ratings." In addition, instead of colors, numbers (e.g., 1 and 2) could be used, as well as any of many other nomenclature schemes to describe the grades of propagation ratings. The "red" "green" ratings discussed herein shall be deemed representative of all such schemes. The number of grades of propagation ratings assigned by a parent node will be equal to the number of children each parent node has. For a branch factor "n" system, the maximum number of grades of propagation ratings would be "n." Since the distribution network in the examples discussed herein is a binary tree distribution network, a parent node will be required to assign at most up to two grades of propagation ratings.

In the example shown in FIG. 23, node P, during the most recent utility rating measurement event, discerned that node Q has a higher utility rating than node X, and therefore P has assigned node Q a green rating, represented by the solid-lined circle surrounding the letter Q in FIG. 23. P has assigned node X a red rating, represented by the dashed-lined circle surrounding the letter X in FIG. 23. In a similar manner, node X has assigned green and red ratings to third level nodes A and B, respectively. At the same time that a parent node assigns a propagation rating to a child node, it also provides to such child node the address of the child node's sibling, if there is any. A child node stores information about its sibling (or siblings) in the sibling portion (or sibling database) 134 of its topology database. The sibling database includes a sibling list, a list of the addresses of a node's siblings. (In the event that the distribution system has a branch factor greater than two, the data relating to the siblings' addresses would also contain information regarding the propagation ratings of the siblings.) In the example shown in FIG. 23, nodes Q and X know that they are each other's siblings and nodes A and B know that they are each other's siblings.

In the event that node X were to leave the distribution network, nodes A and B would of course stop receiving content data from node X. Nodes A and B would consult their topology databases for the address of their grandparent, and each would interrogate node P for instructions. Since node X is out of the distribution network, node P would send out a reconfiguration event signal (sometimes referred to as a "propagation signal") to the nodes which had been node X's children (i.e., the nodes which were node P's grandchildren through node X) and node P would send an upgrade propagation rating signal to its remaining child, here node Q.

In response to the upgrade propagation rating signal, node P's remaining child, node Q, would set its reconfiguration flag buffer 136 to the next highest available propagation rating grade. Since in the example illustrated in FIG. 23 node Q's reconfiguration flag buffer already is set for the highest propagation rating grade (here green), node Q could either do nothing or reset its propagation rating in response to the upgrade propagation rating signal. The result would be the same, node Q's propagation rating would remain green. If node Q's propagation rating were red, then it would set its propagation rating to green in response to the upgrade propagation rating signal. Node Q would do nothing else in response to the upgrade propagation rating signal. (Note that as a matter of design choice, the software engineer could have the parent of the departed node (here node P is the parent of departed node X) send no upgrade propagation rating signal to its remaining child node (here node Q) if its remaining child node already is at the highest propagation rating.)

The recipients of the propagation signal (i.e., the children of the missing node) would respond thereto as follows. First they would check their own respective propagation ratings. If the propagation signal's recipient has the highest propagation rating grade (here green), it would reset its propagation rating to the lowest rating grade (here red); retransmit the propagation signal to its own child nodes (if there are any); disconnect the child node which did not have the highest propagation rating prior to its receipt of the propagation signal if the propagation signal's recipient with the green rating has more than one child node; allow its sibling to dock with it as a child node for the purpose of transmitting content data to that child node; and dock (or remained docked), for purposes of receiving content data, with the node sending the propagation signal to it. (In systems having a branch factor of more than two, the propagation signal recipient whose propagation rating had been the highest would disconnect its child nodes which did not have the highest propagation rating, prior to the receipt of the propagation signal just sent, and it would allow its (i.e., the formerly green node's) siblings to dock with it as child nodes).

If the propagation signal's recipient has other than the highest propagation rating (i.e., just prior to the receipt of the propagation signal), it would upgrade its propagation rating to the next highest rating grade; dock with its sibling which had the highest rating grade; and begin receiving content data from it. If the propagation signal's recipient has other than the highest propagation rating, it does not retransmit the propagation signal to its own child nodes.

In the example illustrated in FIG. 23, nodes A and B receive the propagation signal from node P. Since node A has the highest propagation rating grade, here green, it (i) sets its reconfiguration flag buffer 136 so that it has the lowest propagation rating grade, here red, and (ii) docks with node P (becoming a second level node 13) to begin receiving content data from node P. Node B changes its propagation rating from red to the next higher propagation rating (and since this is a binary tree (or branch factor two) system, the next higher rating is the highest, green) and docks with node A to receive content data. The resulting topology is shown in FIG. 24. Note that node B remains a third level node 14.

Figure 25:
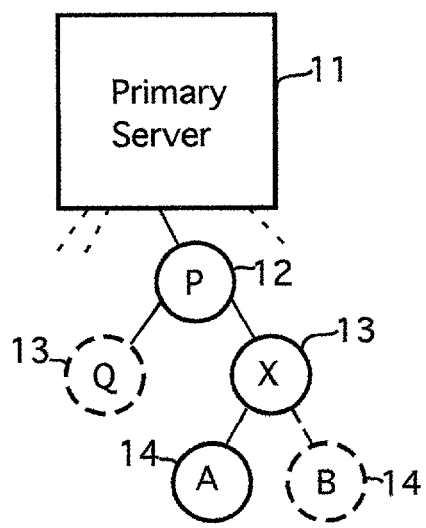
FIG. 25 is a schematic drawing of a topology of the computer information distribution network, slightly different from the topology shown in FIG. 23, before a reconfiguration event.
Figure 26:
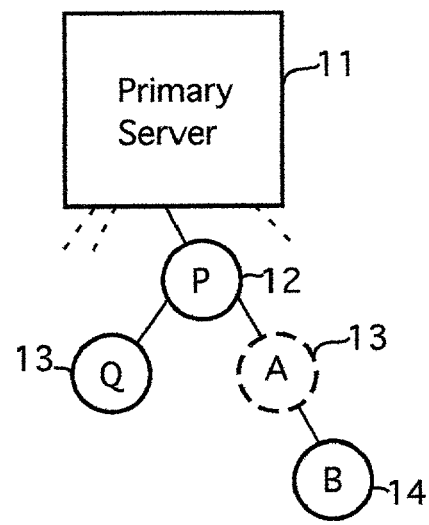
FIG. 26 is a schematic drawing of the topology of the computer information distribution network shown in FIG. 25 after a reconfiguration event.

FIGS. 25 and 26 illustrate what happens when the departing node is green. In FIG. 25, node X is the departing node and it is green. When node P sends the upgrade propagation rating signal to node Q, it changes its propagation rating from red to green. In all other respects the reconfiguration event proceeds as described in the paragraph immediately above, and results in the topology shown in FIG. 26 (which is the same as the topology in FIG. 24).

Figure 27:
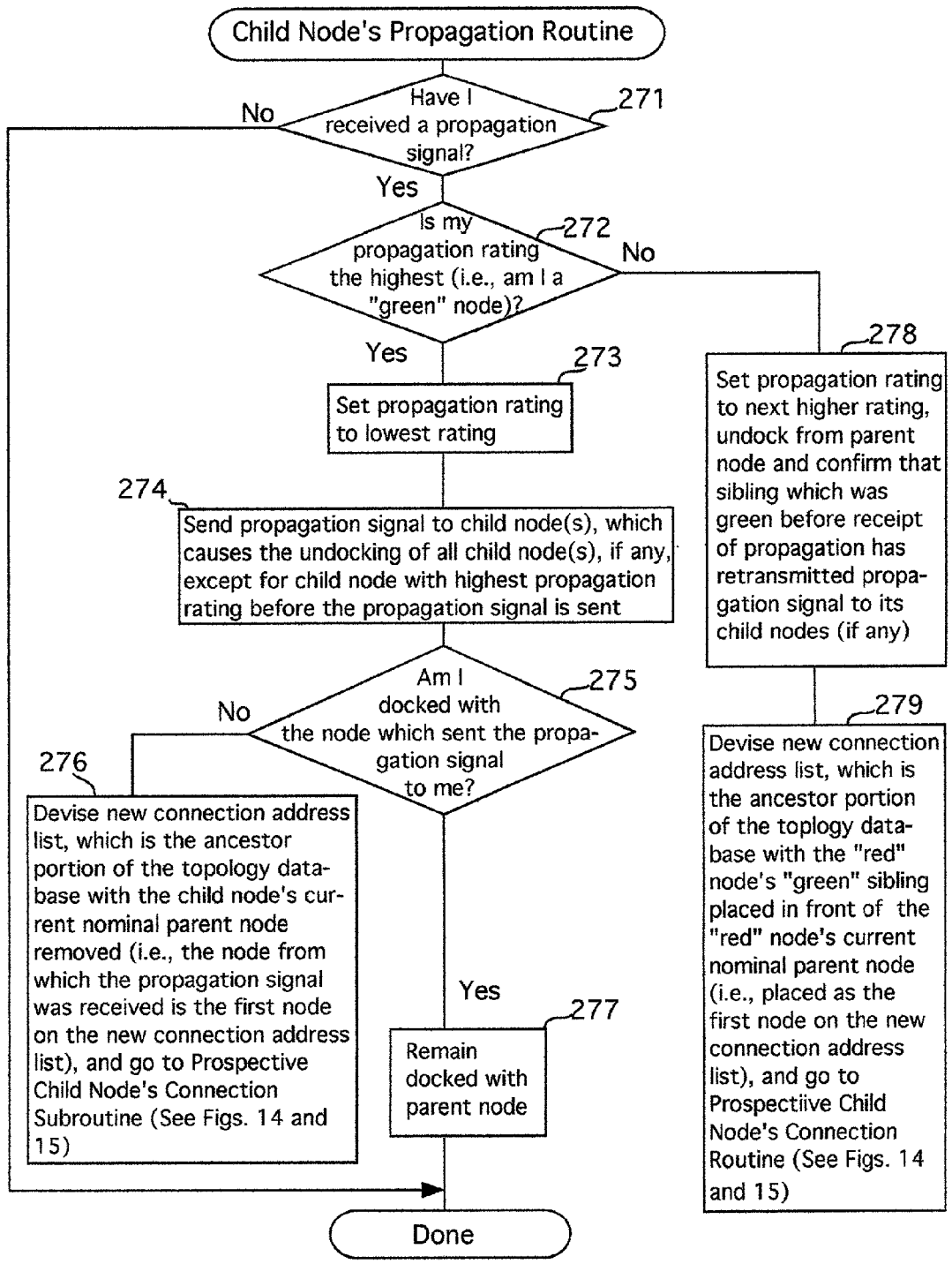
FIG. 27 is a flow diagram showing the Child Node's Propagation Routine.

FIG. 27 is a flow diagram showing the Child Node's Propagation Routine, the routine which is followed by a child node upon receiving a propagation signal. First, the child node performs step 271 wherein it determines whether it has received such a signal. If it has not, then it does nothing. If it has received a propagation signal, it proceeds to step 272 wherein it checks its propagation rating grade in reconfiguration flag buffer 136. If its propagation rating is at the highest grade (i.e., it is a "green" node), then it proceeds to step 273 where it sets its reconfiguration flag buffer to the lowest propagation rating grade. It then proceeds to step 274 in which it retransmits the propagation signal to its own child nodes, and which results in the undocking of all its child nodes except for the one with the highest propagation rating. The child node (i.e., the child node referred to in the second sentence of this paragraph) then performs step 275 in which it determines whether it is already docked with the node which sent the propagation signal. If it is not (i.e., it received the propagation signal from its grandparent), then it proceeds to step 276. In that step it (i) devises a new connection address list, which is the ancestor portion of its topology database with the current nominal parent node removed, resulting in the grandparent node becoming the first node on the connection address list and (ii) then performs the Prospective Child Node's Connection Routine (i.e., it goes to step 141 discussed above in connection with FIGS. 14 and 15). The Prospective Child Node's Connection Routine is performed because some likelihood exists that even the grandparent node may have departed from the distribution system between the moment it sent out the propagation signal and the moment that its highest rated grandchild from its missing child attempting to dock with it.

If the answer to the query in step 275 is in the affirmative (i.e., the child node is receiving a propagation signal which has been retransmitted by its parent), then the child node does nothing more (or as illustrated in FIG. 27, it performs step 277 which is to remain docked to its parent node).

If the answer to the query in step 272 is in the negative (i.e., it does not have the highest propagation rating (it is a "red" node)), then it proceeds to step 278 in which it (i) sets its reconfiguration flag buffer so that its propagation rating is the next higher grade (in a binary tree system the rating is upgraded from red to green), (ii) undocks from the parent with which it was docked before receiving the propagation signal (if it was docked with a parent before receiving such signal); and (iii) either (a) waits a predetermined period of time during which the node's sibling which was green prior to their receipt of the propagation signal should have retransmitted the propagation signal to its own child nodes (thereby causing any red child nodes to undock from it) or (b) confirms that the node's sibling which was green prior to their receipt of the propagation signal actual did retransmit the propagation signal to its child nodes (if it has any). Then the child node performs step 279 in which it (i) devises a new connection address list, which is the ancestor portion of its topology database with its sibling node having the highest propagation rating placed in front of the previous parent as the first node on the connection address list and (ii) then performs the Prospective Child Node's Connection Routine (i.e., it goes to step 141 discussed above in connection with FIGS. 14 and 15). The Prospective Child Node's Connection Routine is performed because the sibling may have departed from the distribution system between the moment that the propagation signal had been sent to the child node and the moment that the child node attempted to dock with its sibling.

FIGS. 28 illustrates a distribution system comprising node P as a first level node 12; nodes Q and X as second level nodes 13; nodes A and B as third level nodes 14; nodes C, D, E an F as fourth level nodes 15; nodes G and H as fifth level nodes 17; nodes I and J as sixth level nodes 20; nodes K and L as seventh level nodes 21 and nodes M and N as eighth level nodes 22. Nodes Q, B, C E, H, I, L and M have red propagation ratings, as symbolized by the dashed circles, and the remaining nodes have green propagation ratings as symbolized by the solid circles. As a result of node X's departing from the system, node P sends out an upgrade propagation rating signal to node Q and a propagation signal to the children of node P's departed child node X (i.e., nodes A and B).

Node Q changes its propagation rating to green.

Nodes A and B begin the Child Node's Propagation Routine. With respect to node A, it answers the query of step 271 in the affirmative. Since its rating is green, it also answers the query of step 272 in the affirmative. In step 273 node A changes the setting of its reconfiguration flag buffer to show a red propagation rating. In step 274 it retransmits the propagation signal to its child nodes C and D. It answers the query of step 275 in the negative because it is not docked for purposes of receiving content data with node P. Node A then goes to step 276 wherein it consults the ancestor portion of its topology database and creates a new connection address list starting with its grandparent. The new connection address list is P-S. Then node A performs the Prospective Child Node's Connection Routine, starting with step 141. (See FIG. 14.) Assuming that no other intervening events have occurred, node A will successfully dock with node P.

Node B answers the query of step 271 in the affirmative and, because its propagation rating was red when it received the propagation signal, it answers the query of step 272 in the negative. From there it goes to step 278 in which it changes its propagation rating to green. Then in step 279 node B consults the ancestor portion of its topology database and creates a new connection address list with its sibling, node A, placed in front of node X as the first address on the new connection address list. The new connection address list is A-X-P-S. Then node B performs the Prospective Child Node's Connection Routine, starting with step 141. Assuming that no other intervening events have occurred, node B will successfully dock with node A. (If node A has disappeared, node B would attempt to dock with node X, but since it is not there, it would move on to node P.)

Node A, which had the higher propagation rating of the two child nodes of departed node X, moves up one level to become a second level node 13. Since it is a "new" entry to the second level, its initial utility rating and its propagation rating will be lower than that of node Q. As time goes by, at subsequent utility rating measurement events node A's utility rating (and hence its propagation rating) may become higher than that of node Q.

Node B, which had the lower propagation rating of the two child nodes of departed node X, does not retransmit the propagation signal to its child nodes (nodes E and F), and they will follow B wherever it goes in the distribution system. In the example discussed here, node B becomes the child of node A while remaining third level node 14. At least initially, it will be the node A's child with the higher utility rating and propagation rating.

As a result of node A's performing step 274, its child nodes C and D (which were fourth level nodes 15 in FIG. 28 when node X was still in the system) receive a propagation signal. Since node C has a red propagation rating, it, like node B, will remain in its level, change its propagation rating to green and dock with its sibling, with the result being that node D becomes its parent.

Since node D had a green propagation rating when it received the propagation signal, it answers the queries of steps 271 and 272 in the affirmative and changes its propagation rating to red in step 274. It answers the query of step 275 in the affirmative, and remains docked with node A. As a result, node D moves up a level and becomes an third level node 14 (with, at least until the next utility rating event, a lower utility rating and propagation rating than its new sibling, node B).

This process proceeds down the tree, with each child of a node which moves up a level doing one of the following:
  (i) if it is a node having a green propagation rating, it remains docked with its parent, thereby itself moving up a level, changes its propagation rating to red and retransmits the propagation signal to its child nodes; or
  (ii) if it is a node having a red propagation rating, it docks with the node which was its sibling, thereby staying in the same level, and changes its propagation rating to green.

The resulting topology after the reconfiguration event caused by node X's departure is illustrated in FIG. 29.

The inventors have determined that reconfiguration with using the Child Node's Propagation Routine when a node departs the system does not result, in the long run, in significantly more inter-node reconnection events than any other reconfiguration method (and arguably results in fewer reconnection events), and helps assure that the more reliable nodes are promoted up the distribution system even if many reconfiguration events occur close in time to each other in a particular tree.

Another embodiment of a propagation routine may be set forth in the following pseudo-code where node X is the node departing from the distribution system:
  Departs(X)
  Begin
    If (X.Parent.GreenChild==X)/*the departing node is green*/
      X.Parent.GreenChild:=X.Parent.RedChild
      X.Parent.RedChild:=X.Greenchild
    Else/*the departing node is already red*/
      X.Parent.RedChild:=X.GreenChild
    Propagate(X.GreenChild, X.RedChild)
  End This is a pseudo-code representation of a method for dealing with the departure of node X.

The following is a pseudo-code representation for dealing with the propagation of node promotion during the network reconfiguration event precipitated by node X's departure:
  Propagate (X, RedSibling)
  Begin
    OriginalGreenChild:=X.GreenChild
    OriginalRedChild:=X. RedChild
    X.RedChild:=X.GreenChild
    X.GreenChild:=RedSibling
    If (OriginalGreenChild<>null)
      Propagate (OriginalGreenChild, OriginalRedChild)
  End
Malfunctioning Nodes In the section above we discussed what happens when a node leaves the distribution network. When a node leaves the network, its parent will, at the next utility rating event, report that it has room for a new node, except when the parent has been contacted about the missing node by its grandchild node or nodes. In which event, a reconfiguration event will proceed as described above.

Sometimes, however, a node intends to remain in the network, but there is a failure of communication.

As indicated earlier, each node's topology database includes information regarding that node's ancestors and descendants. In the event that a child node stops receiving signals from its parent node, the child sends a "complaint" message to its grandparent. The grandparent will check whether the parent is still there. If it is not, then the grandparent sends a propagation signal to the child nodes of the missing parent.

In the preferred embodiment if the grandparent detects that the parent node is actually still there, then the grandparent node will send a disconnect signal to the parent node (sending it back to the server to begin the connection process again) when one of the two following conditions is exists:
  (i) the child node is the only child node of the parent, or
  (ii) the child and its sibling(s) are complaining to the grandparent.

The grandparent would also send a propagation signal to the child nodes of the disconnected parent, and a reconfiguration event would occur.

However, if the child node has siblings and they are not sending complaint signals to the grandparent, then the grandparent assumes that the problem is with the complaining child node. The grandparent sends a disconnect signal to the complaining child node (sending it back to the server to begin the connection process again). If the complaining child node had its own child nodes, they would contact the departed child node's parent to complain, starting a reconfiguration event.

Figure 30:
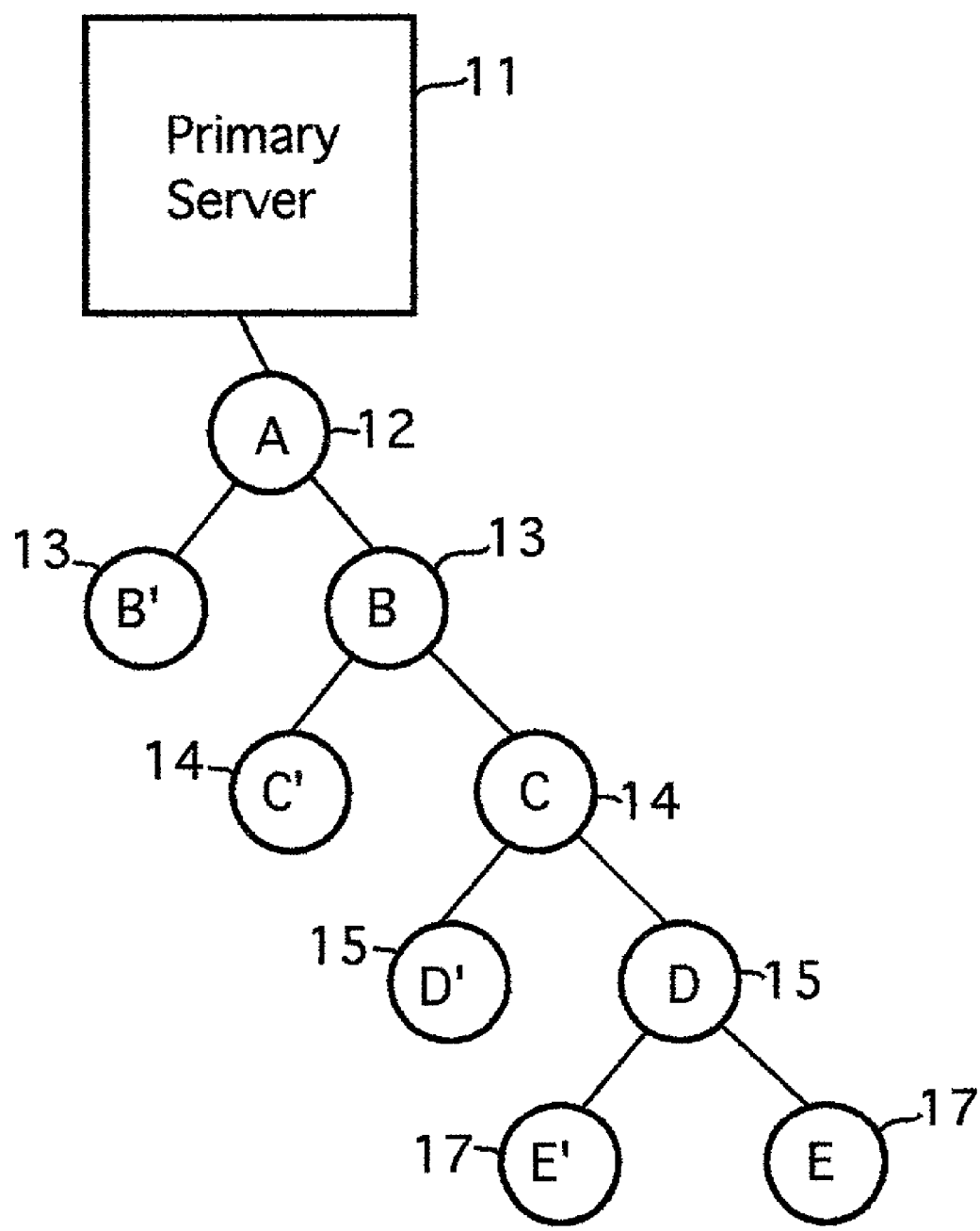
FIG. 30 is a schematic drawing of another topology of the computer information distribution network before a "complaint" regarding communications.

The foregoing can be described in connection with FIG. 30, which depicts a tree in a binary system having a primary server 11, in which node A, a first level node 12, has two child nodes B and B' (which are second level nodes 13); node B has two child nodes C and C' (which are third level nodes 14); node C has two child nodes D and D' (which are fourth level nodes 15); and node D has two child nodes E and E' (which are fifth level nodes 17); and FIG. 31 which is a flow diagram showing the Grandparent's Complaint Response Routine.

Who does node C complain to when node C no longer gets satisfactory service from node B? Node C complains to its grandparent, node A. If node C does not hear back from node A within a predefined amount of time (e.g., if node A has left the network), node C will then exit the network and immediately reconnect as a new node by going to the primary server S for assignment.

What does node A do in response to a complaint from node C? When node A receives a complaint from grandchild node C about node C's parent node B (i.e., node A's child node B), node A will choose to either remove its child node B or its grandchild node C. A will make this determination based on whether node C alone, or both node C and its sibling node C' are experiencing problems with node B, together with the knowledge of whether node A is continuing to receive satisfactory service reports from node B. If node A is continuing to get satisfactory service reports from node B and there is no indication that node C' (the sibling of node C) is experiencing problems with node B, then node A will assign the "fault" to node C and issue a disconnect order for its removal. At this point the green child of node C (i.e., node D or D') will move up a level connecting to parent B, and the red child of node C (the other of node D or D') will connect as a child of its former sibling. The reconfiguration event will then propagate as discussed above.

If, on the other hand, node A is not getting satisfactory service reports from node B and/or a complaint from node C's sibling arrives within a narrow 'window' of node C's complaint, then node A will assign the "fault" to node B and issue a disconnect order for its removal. At this point the green child of node B (i.e., node C or C') will move up a level connecting to grandparent node A, and the red child of node B (the other of node C or C'), will connect as a child of its former sibling. The reconfiguration event will then propagate as discussed above.

An exception to the above is the case where node C is the only child of node B. Under these circumstances node B will be disconnected by node A based solely on the recommendation of node C.

Figure 31:
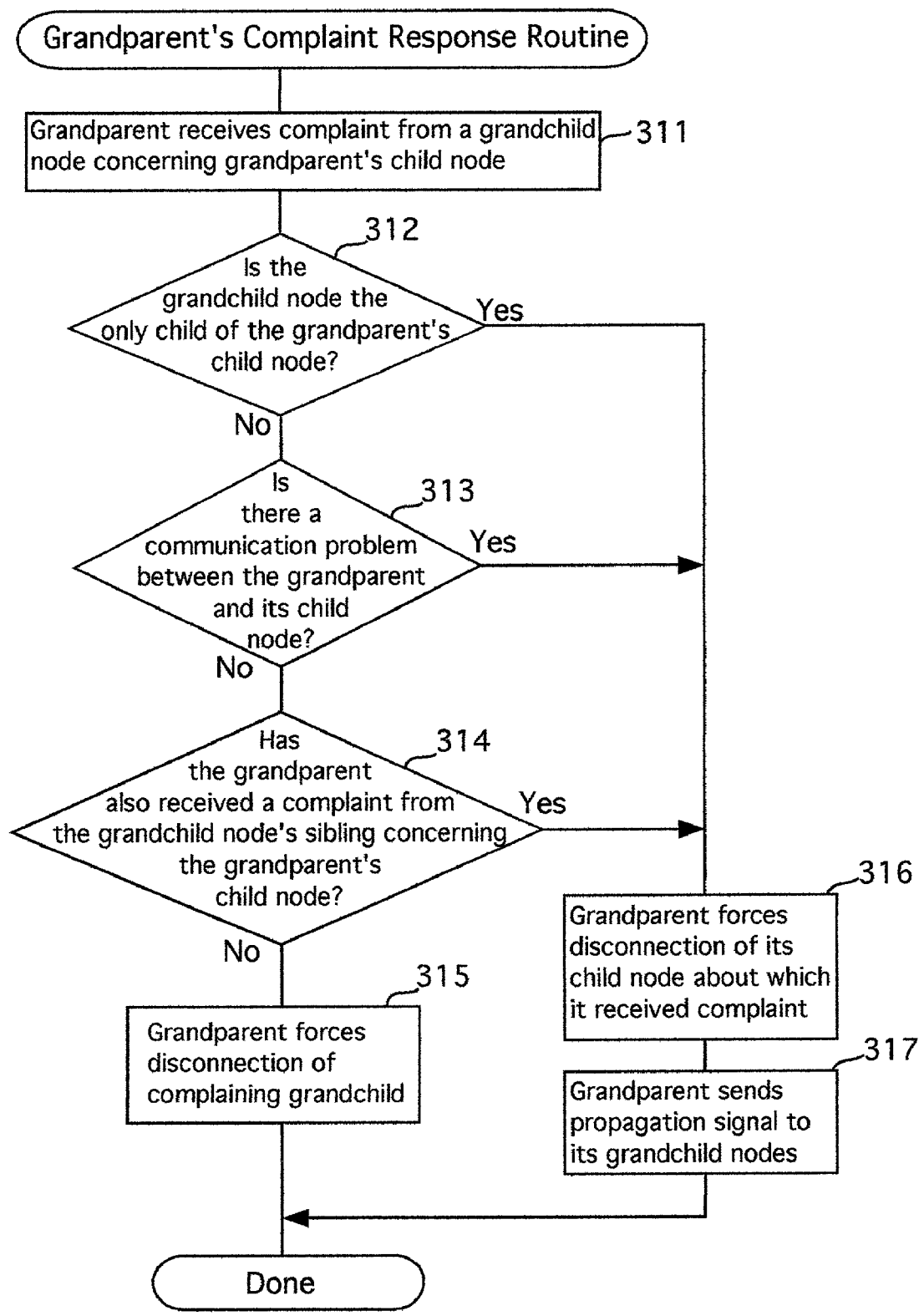
FIG. 31 is a flow diagram showing the Grandparent's Complaint Response Routine.

With reference to FIG. 31, node A receives a complaint from node C about node B in step 311. Node A then goes to step 312 in which it checks its topology database to determine whether node C is the only child of node B. If the answer is no (as shown in FIG. 30), then node A goes to step 313 in which node A determines whether there is a communication problem between it and node B. If the answer is no, then node A proceeds to step 314 in which it determines whether it has received a similar complaint about node B from node C' within a predetermined period of time of node A's having received the complaint from node C. If the answer to that query is no, then node A goes to step 315 in which it sends a disconnect signal to node C. At that point node A has completed the Grandparent's Complaint Response Routine. (A propagation signal does not have to sent by node A to node C's child nodes. If any exist, they will complain to node B which, upon discerning that node C is no longer in the distribution network, will send a propagation signal to such complaining nodes.)

If the response to any of the queries in steps 312, 313 and 314 is yes, then node A proceeds to step 316 in which it disconnects node B. Node A then proceeds to step 317 in which it sends a propagation signal to its grandchild nodes (here nodes C and C') and a reconfiguration event will occur as described above.

The method described above takes a "2 out of 3" approach on the question of node removal. By this the inventors mean that most interior nodes in a distribution network constructed pursuant to their invention will have direct connections to three other nodes: their parent, their green child, and their red child. The connections between a node and its three "neighbor" nodes can be thought of as three separate communications channels. A node is removed from the network when there are indications of failure or inadequate performance on two of these three channels. When there are indications that two of the channels are working normally, the complaining node is presumed to be "unhealthy" and is bounced.

In the case where an interior node has only a single child, the "complaint" of that child to its grandparent is sufficient to remove the parent node—even when the node to be removed is communicating perfectly well with it's own parent. In other words, given the communication chain A-B-C where node A is the parent of node B and node B is the parent of node C, and given that node C has no siblings, then a complaint of node C to node A will cause node A to remove node B regardless of the fact that node A and node B are not having communication problems.

This course of action is preferred to ensure that a potentially unreliable node does not move up the hierarchy of nodes, even at the cost of occasionally bumping a "healthy" node back to the edge of the distribution chain based on uncorroborated complaints of its child.

Stepped Delay of Playing Content Data

In order to have all the user nodes experience the playing of the content data at approximately the same time, regardless of the level in which the node resides, the content data buffer 125 shown in FIG. 13 of a user node may be larger the higher it is in a distribution chain (i.e., the closer it is to the server). The larger the buffer, the greater the amount of time between a particular event (or from the node's receiving the content data), and the node's actually playing the content data in its content data buffer. To the extent that the content data buffer of a node is sized to vary the time that the playing of the content data is started, the content data buffer is a delay. Alternatively, the delay may be a timer or a delay buffer 126 as shown in FIG. 26, or a combination of elements. The delay's purpose is to assure that all users experience the play of the content data approximately simultaneously.

For a distribution network having n levels of user nodes cascadingly connected to a server node, where n is a number greater than one (and therefore the distribution network comprises the server node and first through nth level user nodes), the period of time between (i) the moment content data is received by a node or, more preferably, from a predetermined moment such as a reporting event or utility rating event, the occurrence of which would preferably be based on time periods as measured by a clock outside of the distribution system and would occur approximately simultaneously for all nodes and (ii) the playing of the content data by the node (i.e., the delay time) caused by the delay is greater for a node the higher it is up the distribution chain. That is, the delays in first level nodes create greater delay times than do the delays in second level nodes, the delays in second level nodes create greater delay times than the delays in third level nodes and so on. Described mathematically, in an n level system, where x is a number from and including 2 to and including n, the delay time created by a delay in an $(x-1)$ level node is greater than the delay time created by a delay in an x level node.

By way of example, first level nodes could have a built in effective delay time in playing content data of one-hundred-twenty seconds, second level nodes could have a built in effective delay time of one-hundred-five seconds, third level nodes could have a built in effective delay time of ninety seconds, fourth level nodes could have a built in effective delay time of seventy-five seconds, fifth level nodes could have a built in effective delay time of sixty seconds, sixth level nodes could have a built in effective delay time of forty-five seconds, seventh level nodes could have a built in effective delay time of thirty seconds, and eighth level nodes could have a built in effective delay time of fifteen seconds.

The delays take advantage of the fact that transmission of the packets forming the content data from one node to another takes less time than the actual playing of such packets. This allows for near simultaneous playing of the content data throughout all the levels of the distribution network. The delays will also allow nodes to handle reconnection and reconfiguration events without any significant loss of content data.

It will be understood that various changes of the details, materials, arrangement of parts and process steps, and uses which have been herein described and illustrated in order to explain the nature of the invention will occur to and may be made by those skilled in the art, and such changes are intended to be included within the scope of this invention.

We claim:
1. A process for docking a connection requesting user node with a distribution network, said process including the following steps:
(a) having an instructing node receive a connection request from said connection requesting user node;
(b) forming an instructing node topology database indicating, at a point in time,
(i) which, if any, user nodes are docked with said instructing node as child nodes; which, if any, user nodes are docked with each of said child nodes as grandchild nodes of said instructing node; which, if any, user nodes are docked with each of said grandchild nodes as great-grandchild nodes of said instructing node; and
(ii) a bandwidth capacity of each respective one of said docked user nodes;
(c) selecting from a group of nodes including the instructing node and said docked user nodes a recommended parent node for said connection requesting user node, wherein said recommended parent node has apparent available capacity to transmit content data to said connection requesting user node and is at least as close to said instructing node as any other docked user node having apparent available capacity to transmit content data to said connection requesting user node; and
(d) providing a connection address list to said connection requesting user node, said connection address list listing each node in said instructing node's topology database from said recommended parent node back to said instructing node.

2. The process of claim 1, further comprising the following steps:
(e) having said connection requesting user node go to node at top of said connection address list;
(f) having said connection requesting user node determine whether node at top of said connection address list is part of the distribution network;
(g) if node at top of connection address list is not part of the distribution network, deleting such node from connection address list and repeating steps (e) and (f) with respect to next node at top of connection address list;
(h) if node at top of connection address list is part of said distribution network, having said connection requesting user node dock with said node at top of connection address list.

3. The process of claim 1, wherein step (d) further comprises the following step:
(i) if said instructing node is not a primary server node, including in said connection address list a list of nodes cascadingly connected with each other from the instructing node back to said server node.

4. The process of claim 3, further comprising the following steps:
(e) having said connection requesting user node go to node at top of said connection address list;
(f) having said connection requesting user node determine whether node at top of said connection address list is part of the distribution network;
(g) if node at top of connection address list is not part of the distribution network, deleting such node from connection address list and repeating steps (e) and (f) with respect to next node at top of connection address list;
(h) if node at top of connection address list is part of said distribution network, having said connection requesting user node dock with said node at top of connection address list.

5. The process of claim 3, further comprising the following steps: (e) having said connection requesting user node go to node at top of connection address list;
(f) having said connection requesting user node determine whether node at top of said connection address list is part of the distribution network;
(g) if node at top of connection address list is not part of the distribution network, deleting such node from connection address list and repeating steps (e) and (f) with respect to next node at top of connection address list;
(h) if node at top of connection address list is part of said distribution network, determining whether said node at top of connection address list has available capacity to transmit content data to said connection requesting user node; and
(i) if node at top of connection address list is part of said distribution network and has available capacity to transmit content data to said connection requesting user node, having said connection requesting user node dock with said node at top of connection address list.

6. The process of claim 5, further comprising the following steps:
(j) if node at top of connection address list is part of said distribution network and said node at top of connection address list does not have available capacity to transmit content data to said connection requesting user node, repeating steps (a)–(d), with said node at top of connection address list being said instructing node and a new connection address list being the product of steps (a)–(d).

7. The process of claim 6, further comprising the steps of counting the times that step (j) is performed and, when step (j) is performed a predetermined number of times, having said connection requesting user node repeat steps (a)–(d) with said primary server node being the instructing node.

8. A process for docking a connection requesting user node with a distribution network, said process including the following steps:
(a) having an instructing node receive a connection request from said connection requesting user node; (b) forming an instructing node topology database indicating, at a point in time,
(i) which, if any, user nodes are docked with said instructing node as child nodes; which, if any, user nodes are docked with each of said child nodes as grandchild nodes of said instructing node; which, if any, user nodes are docked with each of said grandchild nodes as great-grandchild nodes of said instructing node; and
(ii) a bandwidth capacity of each respective one of said docked user nodes;
(c) assigning a utility rating to each of the docked user nodes, each of said utility ratings being a function of at least the bandwidth capacity of the docked user node and an elapsed time that the docked user node has been docked with the distribution network;
(d) selecting from a group of nodes including the instructing node and said docked user nodes a recommended parent node for said connection requesting user node, wherein said recommended parent node has apparent available capacity to transmit content data to said connection requesting user node and is at least as close to said instructing node as any other docked user node having apparent available capacity to transmit content data to said connection requesting user node, and when the closest docked user node with apparent available capacity to transmit content data to said connection requesting user node is equidistant to said instructing node with at least one other docked user node with apparent available capacity to transmit content data to said connection requesting user node, said recommended parent node is the docked user node having the highest utility rating among such equidistant docked user nodes with apparent available capacity; and (e) providing a connection address list to said connection requesting user node, said connection address list listing each node in said instructing node's topology database from said recommended parent node back to said instructing node and, if said instructing node is not a primary server node, back to said primary server node.

9. A process for docking a connection requesting user node with a distribution network, said process including the following steps:
  (a) having an instructing node receive a connection request from said connection requesting user node;
  (b) forming an instructing node topology database indicating, at a point in time,
     (i) which, if any, user nodes are docked with said instructing node as child nodes; which, if any, user nodes are docked with each of said child nodes as grandchild nodes of said instructing node; which, if any, user nodes are docked with each of said grandchild nodes as great-grandchild nodes of said instructing node; and
     (ii) a bandwidth capacity of each respective one of said docked user nodes, including a designation of whether the bandwidth capacity of said respective docked user node is below a predetermined threshold, such that said respective docked user node is a low-bandwidth node, or at least said predetermined threshold, such that said respective docked user node is a high-bandwidth node;
  (c) forming a primary recommended parent node list comprised of:
     (1) the instructing node, if it has available capacity to transmit content data to said connection requesting user node, plus
     (2) those docked user nodes having apparent available capacity to transmit content data to said connection requesting user node,
     (3) with said instructing node being placed first on the primary recommended parent node list, if it is on the primary recommended parent node list, and said docked user nodes having apparent available capacity to transmit content data to said connection requesting user node being ranked with those docked nodes which are closer to the instructing node being ranked higher than those docked nodes which are further away and with equidistant docked user nodes being ranked such that those docked nodes which have the higher bandwidth capacity being ranked higher than docked nodes having lower bandwidth capacity;
  (d) forming a secondary recommended parent node list comprised of:
     (1) the instructing node, if it has no available capacity to transmit content data to said connection requesting user node but does have at least one low-bandwidth node docked directly to it, plus
     (2) each of said docked user nodes which (i) is a high-bandwidth node with no available capacity to transmit content data to said connection requesting user node and (ii) has at least one low-bandwidth node docked directly to it,
     (3) with said instructing node being placed first on the secondary recommended parent node list, if it is on the secondary recommended parent node list, and said docked user nodes on the secondary recommended parent node list being ranked with those docked nodes which are closer to the instructing node being ranked higher than those docked nodes which are further away and with equidistant docked user nodes being ranked such that those docked nodes which have the higher bandwidth capacity being ranked higher than docked nodes having lower bandwidth capacity;
  (e) determining whether the connection requesting user node is a low-bandwidth node;
  (f) if the connection requesting user node is a low-bandwidth node,
     (i) selecting the highest ranked node on the primary recommended parent node list as a recommended parent node; and
     (ii) providing a connection address list to said connection requesting user node, said connection address list listing each node in said instructing node's topology database from said recommended parent node back to said instructing node and, if said instructing node is not a primary server node, back to said primary server node; and
  (g) if the connection requesting user node is a high-bandwidth node,
     (i) selecting the highest ranked node on the primary recommended parent node list as a recommended parent node;
     (ii) selecting the highest ranked node on the secondary recommended parent node list as an alternate recommended parent node;
     (iii) determining whether the alternate recommended parent node is closer to the primary server node than the recommended parent node;
     (iv) if the alternate recommended parent node is not closer to the primary server node than the recommended parent node, providing a connection address list to said connection requesting user node, said connection address list listing each node in said instructing node's topology database from said recommended parent node back to said instructing node and, if said instructing node is not the primary server node, back to said primary server node;
     (v) if the alternate recommended parent node is closer to the primary server node than the recommended parent node,
        (1) forcing the disconnection of a low-bandwidth node from the alternate recommended parent node and
        (2) providing a connection address list to said connection requesting user node, said connection address list listing each node in said instructing node's topology database from said alternate recommended parent node back to said instructing node and, if said instructing node is not the primary server node, back to said primary server node.

10. The process of claim 9, wherein step (f)(ii) and includes the following steps:
  (1) adding said connection requesting user node to the topology database as a child of the recommended parent node; and (2) if said recommended parent node would have no apparent available capacity to transmit content data to an additional node with said connection requesting user node docked with it, deleting the recommended parent node from the primary recommended parent node list and adding it to the secondary recommended parent node list.

11. The process of claim 9, wherein step (g)(iv) includes the following steps:
(1) adding said connection requesting user node to the topology database as a child of the recommended parent node;
(2) if said recommended parent node would have no apparent available capacity to transmit content data to an additional node with said connection requesting user node docked with it, deleting the recommended parent node from the primary recommended parent node list; and
(3) if said recommended parent node is deleted from the primary recommended parent node list but has at least one low-bandwidth node docked directly to it, adding the recommended parent node to the secondary recommended parent node list.

12. The process of claim 9, wherein step (g)(v) includes the following steps:
(3) adding said connection requesting user node to the topology database as a child of the alternate recommended parent node; and
(4) if said alternate recommended parent node would have no apparent available capacity to transmit content data to an additional node with said connection requesting user node docked with it, deleting the alternate recommended parent node from the secondary recommended parent node list.

13. The process of claim 9, further comprising the following steps:
(h) having said connection requesting user node go to node at top of connection address list;
(i) having said connection requesting user node determine whether node at top of said connection address list is part of the distribution network;
(j) if node at top of connection address list is not part of the distribution network, deleting such node from connection address list and repeating steps (h) and (i) with respect to next node at top of connection address list; and
(k) if node at top of connection address list is part of said distribution network, having said connection requesting user node dock with said node at top of connection address list.

14. The process of claim 9, further comprising the following steps:
(h) having said connection requesting user node go to node at top of connection address list;
(i) having said connection requesting user node determine whether node at top of said connection address list is part of the distribution network;
(j) if node at top of connection address list is not part of the distribution network, deleting such node from connection address list and repeating steps (h) and (i) with respect to next node at top of connection address list;
(k) if node at top of connection address list is part of said distribution network, determining whether said node at top of connection address list has available capacity to transmit content data to said connection requesting user node; and
(l) if node at top of connection address list is part of said distribution network and has available capacity to transmit content data to said connection requesting user node, having said connection requesting user node dock with said node at top of connection address list.

15. The process of claim 14, further comprising the following steps:
(m) if node at top of connection address list is part of said distribution network and said node at top of connection address list does not have available capacity to transmit content data to said connection requesting user node, repeating steps (a)–(g), with said node at top of connection address list being said instructing node and a new connection address list being the product of steps (a)–(g).

16. The process of claim 15, further comprising the steps of counting the times that step (m) is performed and, when step (m) is performed a predetermined number of times, having said connection requesting user node repeat steps (a)–(g) with said primary server being the instructing node.

17. A process for docking a connection requesting user node with a distribution network, said process including the following steps:
(a) having an instructing node receive a connection request from said connection requesting user node;
(b) determining whether a bandwidth capacity of said connection requesting user node is below a predetermined threshold, such that said connection requesting user node is a low-bandwidth node or at least said predetermined threshold, such that said connection requesting user node is a high-bandwidth node;
(c) forming an instructing node topology database indicating, at a point in time,
(i) which, if any, user nodes are docked with said instructing node as child nodes; which, if any, user nodes are docked with each of said child nodes as grandchild nodes of said instructing node; which, if any, user nodes are docked with each of said grandchild nodes as great-grandchild nodes of said instructing node; and
(ii) a bandwidth capacity of each respective one of said docked user nodes;
(d) if said connection requesting user node is a high-bandwidth user node, selecting from a group of nodes including the instructing node and said docked user nodes a recommended parent node for said connection requesting user node, wherein said recommended parent node has apparent available capacity to transmit content data to said connection requesting user node and is at least as close to said instructing node as any other docked user node having apparent available capacity to transmit content data to said connection requesting user node;
(e) if said connection requesting user node is a low-bandwidth user node, selecting from a group of nodes including the instructing node and said docked user nodes a recommended parent node for said connection requesting user node, wherein said recommended parent node has apparent available capacity to transmit content data to said connection requesting user node and is at least as far from said instructing node as any other docked user node having apparent available capacity to transmit content data to said connection requesting user node; and
(f) providing a connection address list to said connection requesting user node, said connection address list listing each node in said instructing node's topology database from said recommended parent node back to said instructing node.

18. The process of claim 17, wherein step (f) further comprises the following step:
  (i) if said instructing node is not a primary server node, including in said connection address list a list of nodes cascadingly connected with each other from the instructing node back to said primary server node.

19. A process for connecting a connection requesting user node to a computer information distribution network having a primary server node and user nodes docked therewith in a cascaded relationship, said process further comprising the following steps:
  (a) providing said connection requesting user node with a connection address list which sets forth a list of user nodes docked in series with each other back to said primary server node;
  (b) having said connection requesting user node go to node at top of said connection address list;
  (c) having said connection requesting user node determine whether node at top of said connection address list is part of the distribution network;
  (d) if node at top of connection address list is not part of the distribution network, deleting such node from connection address list and repeating steps (b) and (c) with respect to next node at top of connection address list; and
  (e) if node at top of connection address list is part of said distribution network, having said connection requesting user node dock with said node at top of connection address list.

20. A process for connecting a connection requesting user node to a computer information distribution network having a primary server node and user nodes docked therewith in a cascaded relationship, said process further comprising the following steps:
  (a) providing said connection requesting user node with a connection address list which sets forth a list of user nodes docked in series with each other back to said primary server;
  (b) having said connection requesting user node go to node at top of connection address list;
  (c) having said connection requesting user node determine whether node at top of said connection address list is part of the distribution network;
  (d) if node at top of connection address list is not part of the distribution network, deleting such node from connection address list and repeating steps (b) and (c) with respect to next node at top of connection address list;
  (e) if node at top of connection address list is part of said distribution network, determining whether said node at top of connection address list has available capacity to transmit content data to said connection requesting user node; and
  (f) if node at top of connection address list is part of said distribution network and has available capacity to transmit content data to said connection requesting user node, having said connection requesting user node dock with said node at top of connection address list.

21. In a computer information distribution network comprising a primary server node and user nodes docked therewith in a cascaded relationship, wherein each user node may have no more than a predetermined maximum number of child nodes docked with it, a process for reconfiguring the network in the event of a user node's departure therefrom, said process including the following steps:
  (a) providing information at a point in time to a node in the distribution network as follows:
    (i) a propagation rating of the node if it is a user node having a parent node which is a user node, wherein a propagation rating is one of a predetermined number of grades ranging from highest to second highest to third highest, with the number of grades being equal to said predetermined maximum number;
    (ii) an ancestor list setting forth the node's ancestor nodes' addresses, if it has any ancestor nodes, back to the primary server node, with the node's parent node being atop the ancestor list;
    (iii) a sibling list of the node's sibling nodes' addresses, if it has any sibling nodes, and their respective propagation ratings; and
    (iv) a child list of the node's child nodes' addresses, if it has any child nodes, and their respective propagation ratings;
  (b) having a first node send a propagation signal to each former child node of a departed node, wherein said first node is an ancestor of said former child node of said departed node;
  (c) with respect to each child node receiving the propagation signal which did not have the highest propagation rating prior to its receiving the propagation signal, wherein such child node is referred to as a red node, upon such red node receiving the propagation signal,
    (i) setting the propagation rating of the red node to the next higher grade above the propagation rating of that red node before it received the propagation signal;
    (ii) having the red node undock from its parent node, if it was docked with its parent node before it received the propagation signal; and
    (iii) having the red node dock with its sibling node which had the highest propagation rating prior to the red node's receiving the propagation signal;
  (d) with respect to each child node receiving the propagation signal which had the highest propagation rating prior to its receiving a propagation signal wherein such child node is referred to as a green node, upon such green node receiving the propagation signal,
    (i) setting the propagation rating of that green node to the lowest grade;
    (ii) having the green node retransmit the propagation signal to its child nodes, if it has any; and
    (iii) determining whether the green node is docked with the node from which the green node received the propagation signal and if it is, having the green node remain docked with said node from which the green node received the propagation signal, and if it is not, having the green node dock with said node from which the green node received the propagation signal; and
  (e) repeating steps (c) and (d) with respect to each user node which receives a retransmitted propagation signal.

22. In a computer information distribution network comprising a primary server node and user nodes docked therewith in a cascaded relationship, wherein each user node may have no more than a predetermined maximum number of child nodes docked with it, a process for reconfiguring the network in the event of a user node's departure therefrom, said process including the following steps:
  (a) providing information at a point in time to a node in the distribution network as follows:
    (i) a propagation rating of the node if it is a user node having a parent node which is a user node, wherein a propagation rating is one of a predetermined number of grades ranging from highest to second highest to third highest, with the number of grades being equal to said predetermined maximum number;

(ii) an ancestor list setting forth the node's ancestor nodes' addresses, if it has any ancestor nodes, back to the primary server node, with the node's parent node being atop the ancestor list;

(iii) a sibling list of the node's sibling nodes' addresses, if it has any sibling nodes, and their respective propagation ratings; and (iv) a child list of the node's child nodes' addresses, if it has any child nodes, and their respective propagation ratings;

(b) having a first node send a propagation signal to each former child node of a departed node, wherein said first node is an ancestor of said former child node of said departed node;

(c) with respect to each child node receiving the propagation signal which did not have the highest propagation rating prior to its receiving the propagation signal, wherein such child node is referred to as a red node, upon such red node receiving the propagation signal, (i) setting the propagation rating of the red node to the next higher grade above the propagation rating of that red node before it received the propagation signal;

(ii) having the red node undock from its parent node, if it was docked with its parent node before it received the propagation signal;

(iii) devising a first connection address list comprising the address of the red node's sibling node which had the had the highest propagation rating prior to the red node's receiving the propagation signal followed by the red node's ancestor list;

(iv) having said red node go to node at top of first connection address list;

(v) having said red node determine whether node at top of said first connection address list is part of the distribution network;

(vi) if node at top of connection address list is not part of the distribution network, deleting such node from first connection address list and repeating steps (c)(iv) and (c)(v) with respect to next node at top of first connection address list;

(vii) if node at top of first connection address list is part of said distribution network, determining whether said node at top of first connection address list has available capacity to transmit content data to said red node; and vii) if node at top of first connection address list is part of said distribution network and has available capacity to transmit content data to said red node, having said red node dock with said node at top of first connection address list;

(d) with respect to each child node receiving the propagation signal which had the highest propagation rating prior to its receiving a propagation signal, wherein such child node is referred to as a green node, upon such green node receiving the propagation signal, (i) setting the propagation rating of that green node to the lowest grade;

(ii) having the green node retransmit the propagation signal to its child nodes, if it has any; and (iii) determining whether the green node is docked with the node from which the green node received the propagation signal and if it is, having the green node remain docked with said node from which the green node received the propagation signal, and if it is not, devising a second connection address list starting with said node from which the green node received the propagation signal and followed by that portion of said green node's ancestor list extending back to the primary server node from said node from which the green node received the propagation signal;

(iv) having said green node go to node at top of second connection address list;

(v) having said green node determine whether node at top of said second connection address list is part of the distribution network;

(vi) if node at top of connection address list is not part of the distribution network, deleting such node from second connection address list and repeating steps (d)(iv) and (d)(v) with respect to next node at top of second connection address list;

(vii) if node at top of second connection address list is part of said distribution network, determining whether said node at top of second connection address list has available capacity to transmit content data to said green node; and (viii) if node at top of second connection address list is part of said distribution network and has available capacity to transmit content data to said green node, having said green node dock with said node at top of second connection address list; and (e) repeating steps (c) and (d) with respect to each user node which receives a retransmitted propagation signal.

23. The process of claim 22, wherein step (c)(iii) includes the following additional step:

(1) waiting a predetermined period of time so as to allow the red node's sibling with the highest propagation rating prior to the red node's receipt of the propagation signal to retransmit the propagation signal to that sibling node's child nodes, if any.

24. In a computer information distribution network comprising an instructing node having a fist user node docked with said instructing node to receive content data therefrom and a second user node docked with said first user node to receive content data therefrom, a process for handling a purported communication interruption between said first user node and said second user node, said process including the following steps:

(a) having said instructing node receive a first complaint about said first user node from said second user node;

(b) if the second user node is the only user node docked with said first user node at a point in time, if said instructing node receives another complaint about first user node from another user node within a predetermined period of time from when said instructing node received said first complaint or if said instructing node experiences a communication problem between it and said first user node during said predetermined period of time, (i) disconnecting said first user node from said instructing node; and (c) if said instructing node has not experienced a communication problem between it and said first user node during said predetermined period of time and if a plurality of user nodes are docked with said first user node at said point in time and said instructing node has not received another complaint about said first user node from user node other than said second user node within said predetermined period of time, (i) disconnecting said second user node from said first user node.

25. The process of claim 24, wherein step (b) includes the following step:

(ii) sending a signal to the user nodes docked with said first user node indicating the departure of said first user node from said network.

26. The process of claim 24, wherein each user node may have no more than a predetermined maximum number of child nodes docked with it, wherein step (b) includes the following steps:

(ii) providing information at said point in time to each of said second user node, the other user nodes which had been docked with said first user node, if any, and at least one of any user nodes cascadingly connected in the distribution network under said first user node prior to said first user node's being disconnected from said instructing node, if any, as follows:

(1) a propagation rating of the node, wherein a propagation rating is one of a predetermined number of grades ranging from highest to second highest to third highest, with the number of grades being equal to said predetermined maximum number;

(2) an ancestor list setting forth the node's ancestor nodes' addresses, if it has any ancestor nodes, back to the instructing node, with the node's parent node being atop the ancestor list;

(3) a sibling list of the node's sibling nodes' addresses, if it has any sibling nodes, and their respective propagation ratings; and (4) a child list of the node's child nodes' addresses, if it has any child nodes, and their respective propagation ratings;

(iii) having said instructing node send a propagation signal to each of said second user node and the other user nodes which had been docked with said first user node, if any;

(iv) with respect to each user node receiving the propagation signal which did not have the highest propagation rating prior to its receiving the propagation signal, wherein such child node is referred to as a red node, upon such red node receiving the propagation signal, (1) setting the propagation rating of the red node to the next higher grade above the propagation rating of that red node before it received the propagation signal;

(2) having the red node undock from its parent node, if it was docked with its parent node before it received the propagation signal; and (3) having the red node dock with its sibling node which had the highest propagation rating prior to the red node's receiving the propagation signal;

(v) with respect to each user node receiving the propagation signal which had the highest propagation rating prior to its receiving a propagation signal, wherein such child node is referred to as a green node, upon such green node receiving the propagation signal, (1) setting the propagation rating of that green node to the lowest grade;

(2) having the green node retransmit the propagation signal to its child nodes, if it has any; and (3) determining whether the green node is docked with the node from which the green node received the propagation signal and if it is, having the green node remain docked with said node from which the green node received the propagation signal, and if it is not, having the green node dock with said node from which the green node received the propagation signal; and (vi) repeating steps (iv) and (v) with respect to each user node which receives a retransmitted propagation signal.

\* \* \* \* \*